(12) United States Patent
Ayres et al.

(10) Patent No.: US 11,774,681 B2
(45) Date of Patent: Oct. 3, 2023

(54) DUCTED PUPIL EXPANSION

(71) Applicant: Akonia Holographics LLC, Longmont, CO (US)

(72) Inventors: Mark R. Ayres, Boulder, CO (US); Friso Schlottau, Lyons, CO (US); Adam Urness, Boulder, CO (US); Kenneth E. Anderson, Longmont, CO (US)

(73) Assignee: Akonia Holographics LLC, Longmont, CO (US)

( * ) Notice: Subject to any disclaimer, the term of this patent is extended or adjusted under 35 U.S.C. 154(b) by 0 days.

(21) Appl. No.: 17/352,156

(22) Filed: Jun. 18, 2021

(65) Prior Publication Data
US 2021/0311260 A1    Oct. 7, 2021

Related U.S. Application Data

(60) Division of application No. 15/894,903, filed on Feb. 12, 2018, now Pat. No. 11,054,581, which is a (Continued)

(51) Int. Cl.
*G02B 27/00* (2006.01)
*G02B 6/34* (2006.01)
(Continued)

(52) U.S. Cl.
CPC ........... *G02B 6/34* (2013.01); *G02B 27/0081* (2013.01); *G02B 27/0172* (2013.01); *G02B 27/4272* (2013.01)

(58) Field of Classification Search
None
See application file for complete search history.

(56) References Cited

U.S. PATENT DOCUMENTS

| 7,418,170 B2 | 8/2008 | Mukawa et al. |
| 7,502,168 B2 | 3/2009 | Akutsu et al. |

(Continued)

FOREIGN PATENT DOCUMENTS

| CN | 103823267 A | 5/2014 |
| EP | 2065751 A2 | 6/2009 |

(Continued)

OTHER PUBLICATIONS

Levola et al., Near-to-eye display with diffractive exit pupil expander having chevron design, 2008 (Year: 2008).

*Primary Examiner* — Chris H Chu
(74) *Attorney, Agent, or Firm* — Michael H. Lyons

(57) ABSTRACT

A device including a waveguide having a first waveguide surface and a second waveguide surface parallel to the first waveguide surface is disclosed. The device may include a first light coupling device operatively coupled to the waveguide. The first light coupling device may include a first duct structure and a second duct structure oriented to reflect in-coupled light. Each of the first duct structure and the second duct structure may include a first planar region and a second planar region parallel to the first planar region and a first surface and a second surface parallel to the first surface. The device may also include a second light coupling device disposed between the first waveguide surface and the second waveguide surface. The second light coupling device may be positioned to receive reflected in-coupled light from the first light coupling device.

20 Claims, 18 Drawing Sheets

Related U.S. Application Data continuation-in-part of application No. PCT/US2017/038399, filed on Jun. 20, 2017.

(60) Provisional application No. 62/504,890, filed on May 11, 2017, provisional application No. 62/479,985, filed on Mar. 31, 2017, provisional application No. 62/465,619, filed on Mar. 1, 2017.

(51) Int. Cl.
*G02B 27/01* (2006.01)
*G02B 27/42* (2006.01)

(56) References Cited

U.S. PATENT DOCUMENTS

| | | | |
|---|---|---|---|
| 7,764,413 B2 | 7/2010 | Levola | |
| 8,160,411 B2 | 4/2012 | Levola et al. | |
| 8,233,204 B1 | 7/2012 | Robbins et al. | |
| 8,446,675 B1 | 5/2013 | Wang et al. | |
| 8,665,178 B1 | 3/2014 | Wang | |
| 8,736,963 B2 | 5/2014 | Robbins et al. | |
| 8,820,996 B2 | 9/2014 | Aiki et al. | |
| 8,903,207 B1 | 12/2014 | Brown et al. | |
| 9,075,184 B2 | 7/2015 | Popovich et al. | |
| 9,341,846 B2 | 5/2016 | Popovich et al. | |
| 9,456,744 B2 | 10/2016 | Popovich et al. | |
| 9,651,368 B2 | 5/2017 | Abovitz et al. | |
| 9,709,809 B2 | 7/2017 | Miyawaki et al. | |
| 9,791,696 B2 | 10/2017 | Woltman et al. | |
| 10,088,675 B1 | 10/2018 | Brown et al. | |
| 10,145,533 B2 * | 12/2018 | Popovich | F21V 5/04 |
| 10,175,478 B2 | 1/2019 | Tekolste et al. | |
| 10,359,627 B2 | 7/2019 | Wall et al. | |
| 2006/0132914 A1 | 6/2006 | Weiss et al. | |
| 2006/0228073 A1 | 10/2006 | Mukawa et al. | |
| 2007/0188837 A1 | 8/2007 | Shimizu et al. | |
| 2011/0019258 A1 | 1/2011 | Levola | |
| 2013/0250430 A1 | 9/2013 | Robbins et al. | |
| 2014/0140654 A1 | 5/2014 | Brown et al. | |
| 2015/0160529 A1 * | 6/2015 | Popovich | G02B 26/101 359/200.8 |
| 2015/0268467 A1 | 9/2015 | Cakmakci et al. | |
| 2016/0154150 A1 | 6/2016 | Simmonds et al. | |
| 2017/0031160 A1 | 2/2017 | Popovich et al. | |
| 2017/0131551 A1 | 5/2017 | Robbins et al. | |
| 2017/0276940 A1 | 9/2017 | Popovich et al. | |
| 2018/0052277 A1 | 2/2018 | Schowengerdt et al. | |
| 2018/0101011 A1 | 4/2018 | Shih et al. | |
| 2018/0149791 A1 | 5/2018 | Urness et al. | |
| 2018/0172995 A1 | 6/2018 | Lee et al. | |
| 2019/0086674 A1 * | 3/2019 | Sinay | G02B 27/0172 |
| 2019/0094981 A1 | 3/2019 | Bradski et al. | |
| 2020/0201051 A1 | 6/2020 | Popovich et al. | |

FOREIGN PATENT DOCUMENTS

| | | |
|---|---|---|
| JP | 2003536102 A | 12/2003 |
| JP | 2006301229 A | 11/2006 |
| JP | 2007-219106 A | 8/2007 |
| JP | 2009516862 A | 4/2009 |
| JP | 2009145620 A | 7/2009 |
| JP | 2014-132328 A | 7/2014 |
| JP | 2016085430 A | 5/2016 |
| JP | WO2015076335 A1 | 3/2017 |
| KR | 10-2015-0023712 A | 3/2015 |
| WO | 2005093493 A1 | 10/2005 |
| WO | 2009083977 A2 | 7/2009 |
| WO | 2016042283 A1 | 3/2016 |
| WO | 2016054092 A1 | 4/2016 |
| WO | 2017044873 A1 | 3/2017 |
| WO | 2017222808 A1 | 12/2017 |

* cited by examiner

DUCTED PUPIL EXPANSION

CROSS-REFERENCE TO RELATED PATENT APPLICATIONS

This application is a division of U.S. patent application Ser. No. 15/894,903, filed Feb. 12, 2018, which claims the benefit of U.S. Provisional Patent Application No. 62/465,619, filed Mar. 1, 2017, U.S. Provisional Patent Application No. 62/479,985, filed Mar. 31, 2017, and U.S. Provisional Patent Application No. 62/504,890, filed May 11, 2017, and is a continuation-in-part of International Application No. PCT/US17/38399, filed Jun. 20, 2017, each of which is incorporated by reference herein in its entirety.

FIELD OF TECHNOLOGY

The present disclosure relates generally to optical reflective devices, and more specifically to expanding light beams within optical reflective devices.

BACKGROUND

Conventional dielectric mirrors are produced by coating a surface (typically glass) with layers of materials that differ from each other in their electric permittivity. The layers of materials are typically arranged so that Fresnel reflections from layer boundaries reinforce constructively, producing large net reflectivity. Broadband dielectric mirrors can be designed by ensuring that this condition obtains over a relatively broad specified range of wavelengths and incidence angles. However, because the layers are deposited on a surface, the reflective axis of a dielectric mirror is necessarily coincident with surface normal (i.e., the reflective axis is perpendicular to the mirror surface). Because of this constraint on the reflective axis, a dielectric mirror is disposed in some devices in a configuration that is suboptimal. Similarly, the reflective axis being constrained to surface normal makes a dielectric mirror inadequate for some purposes. Moreover, glass dielectric mirrors tend to be relatively heavy, making them suboptimal or inappropriate for applications requiring a relatively lightweight reflective component.

Conversely, conventional grating structures can reflect light about a reflective axis that differs from surface normal of the medium in which the grating structure resides. However, for a given angle of incidence, angles of reflection for conventional grating structures typically co-vary with wavelength of incident light. Thus, using a conventional grating structure to reflect light may avoid the constraint inherent in conventional mirrors that the reflective axis coincide with surface normal. However, where a substantially constant reflective axis is required, a conventional grating structure is substantially limited to a single wavelength (or very narrow range of wavelengths) for a given angle of incidence. Similarly, in order to reflect light of a specified wavelength about a constant reflective axis, a conventional grating structure is limited to a single angle of incidence (or very narrow range of incidence angles).

Accordingly, conventional reflective devices, comprising reflective grating structures or conventional mirrors may not satisfy properties necessary of the device, including light reflectivity about a reflective axis not constrained to surface normal, and an angle of reflection that is constant across a range of incidence angles. Furthermore, conventional structures and coupling components of a conventional reflective device may interact with light of the device (e.g., with total internal reflection (TIR) mode reflected light and non-TIR straight through external light) and impede optical clarity of the projection. As a result, conventional reflective devices may provide suboptimal image projection and retard optical clarity at the yielded field of view (FOV) of these devices. Such results may be particularly acute in head mounted display (HMD) devices.

SUMMARY

The described features generally relate to one or more improved methods, systems, or devices for directing incident light beams (e.g., modes) comprising an entrance pupil of an image projection system to an emitted exit pupil. The methods, systems, or devices may include one or more duct structures fabricated from a single substrate and including absorptive and reflective coatings. The expanders may promote pupil expansion techniques in an optical device or system, to enable an increased field of view (FOV) of a projected image.

In one embodiment, a device or system may include a waveguide having a first waveguide surface and a second waveguide surface parallel to the first waveguide surface, a first light coupling device operatively coupled to the waveguide, a second light coupling device disposed between the first waveguide surface and the second waveguide surface. The first light coupling device may include a first duct structure and a second duct structure. Each of the first and second duct structures may be oriented to reflect in-coupled light and include a first planar region and a second planar region parallel to the first planar region and a first surface and a second surface parallel to the first surface. The first and second surfaces may be orthogonal to the first and second planar regions. The second light coupling device may be positioned to receive reflected in-coupled light from the first light coupling device.

In some examples of the device or system described above or other devices or systems described herein, the first duct structure and the second duct structure may be oriented to reflect rays of in-coupled light incident on the corresponding first planar region as reflected light having a first angle of reflection with respect to a first axis corresponding to a propagation direction of a respective duct structure and a second angle of reflection with respect to a second axis corresponding to a transverse dimension of the propagation direction.

In some examples of the device or system described above or other devices or systems described herein, the first duct structure or the second duct structure of the first light coupling device may further include one or more reflective coating elements disposed at the first planar region of the respective first or second duct structure. Additionally or alternatively, the first duct structure or the second duct structure of the first light coupling device may further include one or more reflective coating elements disposed at the second planar region of the respective first or second duct structure.

In some examples of the device or system described above or other devices or systems described herein, at least one of the one or more reflective coating elements may be configured to sustain partial light reflectivity of light incident on a respective first or second planar region for one or more angles of reflection spanning at least some angles below a corresponding critical angle of the first or second planar region.

In some examples of the device or system described above or other devices or systems described herein, the first duct structure or the second duct structure of the first light coupling device may further include one or more reflective coating elements disposed at the first surface of the respective first or second duct structure. Additionally or alternatively, first duct structure or the second duct structure of the first light coupling device may further include one or more reflective coating elements disposed at the second surface of the respective first or second duct structure.

In some examples of the device or system described above or other devices or systems described herein, at least one of the one or more reflective coating elements may be configured to sustain spatial uniformity of reflectivity corresponding to incident light for at least one of an angle of incidence of the incident light, a wavelength of the incident light, or a polarization of the incident light.

In some examples of the device or system described above or other devices or systems described herein, at least one of the one or more reflective coating elements may be configured to spatially vary reflectivity corresponding to incident light based at least in part on an angle of incidence of the incident light.

In some examples of the device or system described above or other devices or systems described herein, each of the one or more reflective coating elements may include at least one of a metallic coating element, a dielectric coating element, or a polymer film.

In some examples of the device or system described above or other devices or systems described herein, the first light coupling device may further include a light input component. In some examples, each of the first and second duct structures may be angularly offset from a longitudinal axis of the light input component.

In some examples of the device or system described above or other devices or systems described herein, the light input component may include at least one of a beveled edge component, a coupling prism, or a prism plinth.

In some examples of the device or system described above or other devices or systems described herein, the second light coupling device may further include a volume holographic light coupling device structured to reflect at least a portion of incident light as reflected light, the incident light having a first angle of incidence within a total internal reflection (TIR) range with respect to a first axis corresponding to a surface normal of the waveguide and a second angle of incidence with respect to a second axis different from the first axis. In some examples, the reflected light may have a first angle of reflection within the TIR range and a second angle of reflection with respect to the second axis. The second angle of reflection may be different from the second angle of incidence.

In some examples of the device or system described above or other devices or systems described herein, the first duct structure or the second duct structure of the first light coupling device may further include a first end contiguous to the first and second planar regions and the first and second surfaces of the respective first or second duct structure. In some examples, the first duct structure or the second duct structure of the first light coupling device may further include a second end contiguous to the first and second planar regions and the first and second surfaces of the respective first or second duct structure. In some examples, the second end may be offset from the first end by a spatial length substantially equal to a length of the respective first or second duct structure in the propagation direction. In some examples, at least one of the first end or the second end includes an end reflective coating element. In some examples, the end reflective coating element includes an absorptive coating element or a fully reflective coating element.

In some examples of the device or system described above or other devices or systems described herein, the first duct structure may be oriented to reflect in-coupled light corresponding to a first range of vertical field angles and the second duct structure is oriented to reflect in-coupled light corresponding to a second range of vertical field angles, the second range of vertical field angles including at least some vertical field angles different from vertical field angles of the first range of vertical field angles.

In some examples of the device or system described above or other devices or systems described herein, at least one of the first duct structure or the second duct structure of the first light coupling device may further include a fully reflective coating element disposed at the first planar region of the respective first or second duct structure.

In some examples of the device or system described above or other devices or systems described herein, at least one of the first duct structure or the second duct structure of the first light coupling device may further include a fully reflective coating element disposed at the second planar region of the respective first or second duct structure.

In some examples of the device or system described above or other devices or systems described herein, at least one of the first duct structure or the second duct structure of the first light coupling device may further include a partially reflective coating element disposed at the first surface of the respective first or second duct structure. In some examples, the first surface of the respective duct structure may be a surface adhered to the first waveguide surface of the waveguide.

In some examples of the device or system described above or other devices or systems described herein, the first light coupling device may further include a media layer block. In some examples the media layer block may include an absorptive coating element or a partially reflective coating element.

In some examples of the device or system described above or other devices or systems described herein, the first planar region of the first duct structure may be orthogonally aligned with the first planar region of the second duct structure.

In some examples of the device or system described above or other devices or systems described herein, the first duct structure may include a first bevel planar region and the second duct structure may include a second bevel planar region. In some examples, the first bevel planar region of the first duct structure may be oriented parallel to the second bevel planar region of the second duct structure.

In some examples of the device or system described above or other devices or systems described herein, the first duct structure and the second duct structure may be joined to a reference flat with an optical adhesive element.

In some examples of the device or system described above or other devices or systems described herein, the second light coupling device may include a first shadow casting element and a second shadow casting element. In some cases, the first shadow casting element and the second shadow casting element may be located at a partially reflective coating element. In some cases, the first shadow casting element may be located at the first waveguide surface and the second shadow casting element may be located at the second waveguide surface.

In some examples of the device or system described above or other devices or systems described herein, the second light coupling device may include a first reflective axis that is oriented on a plane parallel to the first waveguide surface.

In some examples of the device or system described above or other devices or systems described herein, the second light coupling device may include a grating medium, and a first grating structure within the grating medium, the first grating structure being structured to reflect at least a portion of incident light of a first wavelength about a first reflective axis at a first angle of incidence within the TIR range with respect the first reflective axis. In some examples, the first grating structure may be further configured to reflect at least a portion of incident light of a wavelength about the first reflective axis at a first range of incidence angles including a first incidence angle, each incidence angle of the first range of incidence angles being within the TIR range with respect the first reflective axis. In some cases, the first grating structure may be further configured to reflect light of a wavelength about the first reflective axis offset from a surface normal of the grating medium at a first range of incidence angles including a first incidence angle, and wherein each incidence angle of the first range of incidence angles is greater than a second incidence angle. In some examples, the wavelength may include one of a visible red light wavelength, a visible blue light wavelength, or a visible green light wavelength. In some examples, the first grating structure may include at least three volume holograms, each volume hologram of the at least three volume holograms corresponding to a unique incidence angle within the first range of incidence angles, and wherein an adjacent $|\Delta K_G|$ for the at least three holograms has a mean value that resides between $1.0 \times 10^4$ and $1.0 \times 10^6$ radians per meter (rad/m). In some examples, the second light coupling device may further include a second grating structure within the grating medium, the second grating structure being structured to reflect at least a portion of incident light of the first wavelength about another reflective axis at another angle of incidence different from a first incidence angle. In some examples, the other reflective axis of the second grating structure may have a reflective axis angle that differs from a reflective axis angle of the first reflective axis by 0.25 degrees or less.

In some examples of the device or system described above or other devices or systems described herein, the second light coupling device includes a grating medium that is at least 70 μm thick and the grating medium includes a plurality of volume holograms structured to Bragg-match incident light for at least some angles of incidence within the TIR range.

In another embodiment, a device or system may include may include a waveguide having a first waveguide surface, a second waveguide surface parallel to the first waveguide surface, and an planar region portion aligned on a plane different from a plane of the first waveguide surface, a first light coupling device operatively coupled to the waveguide, a light input portion positioned on the first light coupling device; and a second light coupling device disposed between the first waveguide surface and the second waveguide surface. In some examples, the first light coupling device may include at least one duct structure. The at least one duct structures may include a first planar region and a second planar region parallel to the first planar region, and a first surface and a second surface parallel to the first surface. The first and second surfaces may be orthogonal to the first and second planar regions. In some examples, the second light coupling device may include a volume holographic light coupling device.

In some examples of the device or system described above or other devices or systems described herein, the second light coupling device may have a reflective axis that is oriented on a plane orthogonal to the plane of the first waveguide surface.

In some examples of the device or system described above or other devices or systems described herein, the light input portion may include an aperture. In some cases, the aperture may be oriented on a substrate section of the first light coupling device, the substrate section corresponding to at least one of an end of the at least one duct structure. In some examples, the aperture may be oriented on a substrate section of the first light coupling device, the substrate section corresponding to at least one of a corner of the at least one duct structure.

Some examples of the device or system described above or other devices or systems described herein may further include an image-bearing light source, and an optical element for receiving image bearing light as in-coupled light and projecting the in-coupled light to the light input portion.

In some examples of the device or system described above or other devices or systems described herein, the second light coupling device may have a spatially-varying reflective axis that is oriented on a plane orthogonal to a plane of the first waveguide surface.

In some examples of the device or system described above or other devices or systems described herein, the light input portion includes an elongated surface section having a longitudinal center substantially aligned with a longitudinal center of an eyebox associated with the second light coupling device.

BRIEF DESCRIPTION OF THE DRAWINGS

A further understanding of the nature and advantages of implementations of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
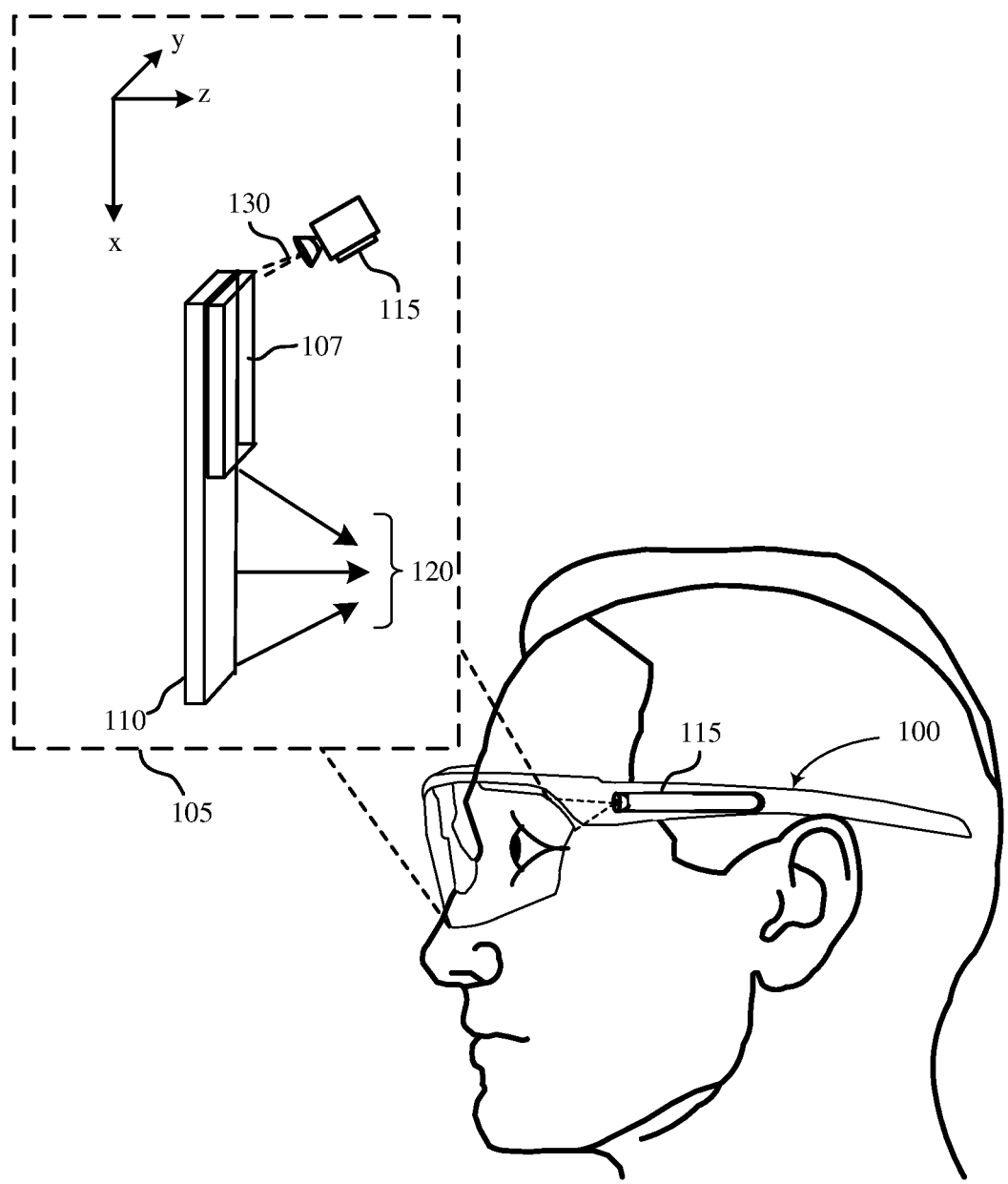
FIG. 1 is an illustration of an HMD device in which the principles included herein may be implemented.

Volumetric holographic gratings (VHGs) may be used as a light coupling device (e.g., an input coupler, an output coupler, and/or a cross coupler) within an image projection system. Each conventional coupling device may transmit light through a waveguide, employ pupil expansion techniques, and provide an image projection, in accordance with additional features of the coupling device. A conventional coupling device may include embossed diffractive gratings, diffractive optical elements (DOEs), holographic optical elements (HOEs), and angled partially reflective surfaces to support at least the aforementioned features. The one or more properties of the conventional coupling device, including the thickness and bulk index of refraction, may determine an accessible total internal reflection (TIR) input angle range, as well as a yielded field of view (FOV) capability. In some cases, a conventional coupling device, either alone or in combination with additional coupling devices, may incur limitations or impedances to optical clarity and the FOV. For example, the conventional coupling device may interact with each of the bidirectional reflections of light operating in a TIR mode, thereby impeding the yielded FOV. In other examples, the conventional coupling device may interact with light straight through the device (e.g., non-TIR modes) or experience chromatic dispersion, impeding the optical clarity of an image projection system.

One or more skew mirror type components or devices may be employed in a light coupling device (e.g., an input coupler, an output coupler, and/or a cross coupler) for pupil expansion. Utilizing skew mirror technology in the one or more light coupling devices may improve viewing capability and optical clarity of an associated image projection device, such as a head-mounted display unit. A skew mirror type device may exhibit achromatic characteristics. A skew mirror type device (e.g., an output coupler embodiment) may be Bragg-mismatched to one reflection of TIR mode input light that is reflected between substrates and to input light passing straight through the skew mirror type device (e.g., external light incident on a substrate surface). An image projection device utilizing skew mirror technology may provide a more expansive FOV and avoid impedances to optical clarity when compared to an image projection device using conventional coupling devices.

A device (e.g., a duct structure) may be fabricated from a single substrate (e.g., a piece of glass), and impose one or more fully and/or partially reflective coatings to direct propagated light in both a dimension of reflection and a transverse dimension. The coatings may be applied to one or more surfaces or planar regions comprising the duct. In embodiments of the device, homogeneous planar regions of the duct may sustain parallelism, and impose surface perpendicularity to surfaces of the duct. One or more ends of the duct may be coated with an absorptive material to lessen stray light at the duct. The one or more ends may comprise an input aperture of the duct, with incident light at the aperture constituting an input pupil. Based at least in part on the aforementioned embodiments, light of the input pupil may propagate through the duct structure and incur reflections at the coatings of the surfaces and/or planar regions of the duct. The duct may then emit an expansion of the propagated input pupil, with reduced pupil replication gaps, uniformity at the pupil, and enhanced light efficiency.

A light coupling device (e.g., a cross coupler) may include one or more duct structures, of common distinct sizes, having a geometry and orientation corresponding to a directed projection output (e.g., a projection directed to a particular locale of the waveguide surface). The duct structures may uniformly reflect all wavelengths corresponding to a span of field angles within each respective duct, providing an expanded pupil that supports lateral homogeneity of the projections. The resulting projection may promote light efficiency via the duct orientation, while sustaining image fidelity (i.e., absence of gaps) and thus image quality throughout the light coupling device.

For example, one or more optical components or devices (e.g., an input coupler embodiment) may guide incident light of an input pupil into the image projection system. One or more ducted optical components or devices (e.g., a cross coupler embodiment) may receive the one or more incident light beams via a input aperture. In some cases, the input aperture may be positioned at an planar region of the one or more duct structures. The one or more duct structures may be arranged and disposed at relative angles (e.g., orthogonal) to form a light coupling device (e.g., a cross coupler). The one or more duct structures may utilize partially and/or fully reflective coatings for reflecting light beams (e.g., modes) of the incident light at a first angle of reflection within a total internal reflection (TIR) range, common to a propagation direction. Additional planar regions of the respective duct structures may guide the reflected light at a second angle of reflection with respect to a second, transverse axis to the propagation direction. The reflected light may then be propagated through the one or more duct structures as an output pupil of the image projection, and directed to an output coupler. One or more skew mirror type components or devices (e.g., an output coupler embodiment) may allow for image projection with reduced divergent light loss. Light coupling device embodiments utilizing skew mirror technology of an image projection system may be contained within one or more intercoupled waveguides, further improving image projection efficiency and increasing device compactness. Light coupling device embodiments utilizing skew mirror technology may be incorporated into an image projection system that also utilizes other, non-skew mirror light coupling device embodiments.

One or more holographic optical elements and/or duct structures may be used in a waveguide of an optical head-mounted display (HMD) device. A HMD device is a wearable device that has the capability of reflecting projected images, and may facilitate a user to experience augmented reality. Head-mounted displays may include near-eye optics that project virtual images at an optical perspective of the device. In the past, technical limitations of HMDs have resulted in experience impediments including reduced image quality and increased weight and size. Past implementations have included conventional optics to reflect, refract, or diffract light, however, at a cost to compactness. Aspects of the disclosure are initially described in the context of an apparatus for reflecting light to an alternate light coupling device, for expanded image projection. The alternate light coupling device may be implemented for reflecting light towards an eye box situated a fixed distance from a skew mirror. Specific examples include embodiments where the alternate device may include a grating medium comprising one or more grating structures. The grating structures may be configured to reflect light, of a wavelength, about a reflective axis offset from surface normal of the structure, at a plurality of particular incident angles. Aspects of the disclosure are further illustrated by and described with reference to apparatus diagrams, system diagrams, and flowcharts that relate to duct pupil expansion.

The aforementioned description provides examples, and is not intended to limit the scope, applicability or configuration of implementations of the principles described herein. Rather, the ensuing description will provide those skilled in the art with an enabling description for implementing implementations of the principles described herein. Various changes may be made in the function and arrangement of elements.

Thus, various implementations may omit, substitute, or add various procedures or components as appropriate. For instance, aspects and elements described with respect to certain implementations may be combined in various other implementations. It should also be appreciated that the following systems, methods, devices, and software may individually or collectively be components of a larger system, wherein other procedures may take precedence over or otherwise modify their application.

FIG. 1 is an illustration of an HMD device 100 in which the principles included herein may be implemented. The HMD device 100 may include eyewear or headwear in which a near-eye display (NED) 105 may be affixed in front of a user's eyes. The NED 105 may include a diffractive element portion disposed within or incorporated with a lens assembly of the HMD device 100. In some examples, the diffractive element portion may be a holographic optical element (HOE), which may be comprised of a skew mirror 110. Coordinates (x, y, and z-axis) are provided with reference to the skew mirror 110. The HMD device 100 may include multiple light coupling elements including additional skew mirrors (not shown), HOEs not structured using skew mirror technology and principles (not shown), DOEs (not shown), and/or louvered mirrors (not shown) assembled with the skew mirror 110. For example, HMD device 100 may include duct structure 107. Duct structure 107 may be coupled to skew mirror 110. The HMD 100 may also include a light source or light projector 115 operatively coupled to the lens assembly. In some examples light source or light projector 115 may be operatively coupled to the lens assembly in a waveguide configuration. In some examples light source or light projector 115 may be operatively coupled to the lens assembly in a free space configuration.

The skew mirror 110 may be a reflective device and may include a grating medium within which resides one or more volume holograms or other grating structures. The skew mirror 110 may include an additional layer such as a glass cover or glass substrate. The additional layer may serve to protect the grating medium from contamination, moisture, oxygen, reactive chemical species, damage, and the like. The additional layer may also be refractive index matched with the grating medium. The grating medium, by virtue of the grating structure residing therein, may have physical properties that allow the medium to diffract light about an axis, referred to as a reflective axis, where the angle of diffraction (henceforth referred to as angle of reflection) varies by less than 1° for multiple wavelengths of light incident upon the grating medium at a given angle of incidence. In some cases, the reflective axis is also constant for multiple wavelengths and/or angles of incidence. In some cases, the grating structure is formed by one or more holograms. The one or more holograms can be volume-phase holograms in some implementations. Other types of holograms may also be used in various implementations of the grating structure.

Similarly, implementations may have substantially constant reflective axes (i.e., reflective axes have reflective axis angles that vary by less than 1°) across a range of incidence angles for incident light of a given wavelength, and this phenomenon may be observed with incident light at various wavelengths. In some implementations, the reflective axes remain substantially constant for every combination of a set of multiple incidence angles and a set of multiple wavelengths.

A hologram may be a recording of an interference pattern, and may include both intensity and phase information from the light used for the recording. This information may be recorded in a photosensitive medium that converts the interference pattern into an optical element that modifies the amplitude or the phase of subsequent incident light beams, according to the intensity of the initial interference pattern. The grating medium may include a photopolymer, photorefractive crystals, dichromatic gelatin, photo-thermo-refractive glass, film containing dispersed silver halide particles, or other material with the ability to react to and record an incident interference pattern. In some cases, coherent laser light may be used for recording and/or reading the recorded hologram.

In some cases, a hologram may be recorded using two laser beams known as recording beams. In some cases, the recording beams may be monochromatic collimated plane wave beams that are similar to each other except for angles at which they are incident upon the grating medium. In some implementations, the recording beams may have amplitude or phase distributions that differ from each other. The recording beams may be directed so that they intersect within the recording medium. At the intersection of the recording beams, the recording beams may interact with the recording medium in a way that varies according to the intensity of each point of the interference pattern, and creates a pattern of varying optical properties within the recording medium. For example, in some embodiments, a refractive index may vary within the recording medium. In some cases, the resulting interference pattern may be spatially distributed (e.g., with a mask or the like) in a manner that is uniform for all such grating structures recorded on the grating medium. In some cases, multiple grating structures may be superimposed within a single recording medium by varying the wavelength or the angle of incidence to create different interference patterns within the recording medium. In some cases, after one or more holograms are recorded in the medium, the medium may be treated with light in a post-recording light treatment. The post recording light treatment may be performed with highly incoherent light to substantially consume remaining reactive medium components such as photoinitiator or photoactive monomer, such that photosensitivity of the recording medium is greatly reduced or eliminated. After recording of holograms or other grating structures in a recording medium has been completed, the medium is typically referred to as a grating medium. In some instances, grating mediums have been rendered non-photosensitive.

In some implementations, the grating structure may include a hologram generated via interference between multiple light beams referred to as recording beams. The grating structure may include multiple holograms. The multiple holograms may be recorded using recording beams incident upon the grating medium at angles that vary among the multiple holograms (i.e., angle multiplexed), and/or using recording beams whose wavelengths vary among the multiple holograms (i.e., wavelength multiplexed)), and/or using recording beams whose positions vary among the multiple holograms (i.e., spatially multiplexed). In some implementations, the grating structure may include a hologram recorded using two recording beams whose angles of incidence upon the grating medium vary while the hologram is being recorded, and/or whose wavelengths vary while the hologram is being recorded. Implementations further include a device wherein the reflective axis differs from surface normal of the grating medium by at least 1.0 degree; or at least by 2.0 degrees; or at least by 4.0 degrees; or at least by 9.0 degrees.

Light projector 115 may provide image-bearing light to the lens assembly. In some instances, the lens assembly and skew mirror may be substantially flat with respect to an orientation plane of the system. In other instances, the lens assembly may exhibit curvature with respect to an orientation plane. For example, in some cases, lens assembly and skew mirror 110 may be substantially flat with respect to the x-y plane. In other cases, the lens assembly may include some curvature with respect to the x-y plane in certain implementations. Reflected light 120 from skew mirror 110 may be reflected towards an eye box situated at a fixed distance along the z-axis away from skew mirror 110. In some examples, skew mirror 110 may be contained at least partially within a waveguide. The waveguide may propagate incident light 120 by total internal reflection towards the skew mirror 110. In some examples, incident light 120 may propagate by free space towards skew mirror 110. The skew mirror 110 may include a grating medium made of a photopolymer. The skew mirror 110 may also include one or more grating structures within the grating medium. Each grating structure may include one or more sinusoidal volume gratings which may overlap with each other. A grating structure may be configured to reflect light of a particular wavelength about a reflective axis offset from a surface normal of the grating medium at a particular plurality of incidence angles. Each grating structure within the grating medium may be configured to reflect a portion of light toward an exit pupil in the eye box at a fixed distance from the waveguide.

Each grating structure may reflect light in a manner different from another grating structure. For example, a first grating structure may reflect incident light of a first wavelength at a first incidence angle, whereas a second grating structure may reflect incident light of a second wavelength at the first incidence angle (e.g., different grating structures may be configured to reflect different wavelengths of light for incident light of the same incidence angle). Also, a first grating structure may reflect incident light of a first wavelength at a first incidence angle, whereas a second grating structure may reflect incident light of the first wavelength at a second incidence angle (e.g., different grating structures may be configured to reflect the same wavelength of light for incident light of different incidence angles). Furthermore, a grating structure may reflect first incident light of a first wavelength and first incidence angle, and the grating structure may reflect second incident light at a second wavelength and second incidence angle about the same reflective axis. In this manner, different grating structures can be used to selectively reflect a particular wavelength of light for incident light at a range of incidence angles. The different grating structures may be super-imposed within the grating medium of the skew mirror 110. The skew mirror 110 may have a substantially constant reflective axis (i.e., each grating structure of the skew mirror 110 has a same substantially constant reflective axis).

In some examples, an HMD device may comprise a light source or light projector 115 for providing image-bearing light and a lens assembly. The lens assembly may include at least one duct structure 107 and at least one skew mirror 110. The lens assembly may comprise a light input section for receiving the image-bearing light from the light source or light projector 115. A waveguide may be disposed within the lens assembly and operatively coupled to the light input section. In some examples, the waveguide may be omitted and the light source or light projector 115 may be operatively coupled to the lens assembly in a free space configuration.

The waveguide may have a first waveguide surface and a second waveguide surface parallel to the first waveguide surface. A first light coupling device may be coupled to the waveguide and include a first duct structure and second duct structure. Each of the first duct structure and second duct structure may include a pair of parallel planar regions and a pair of parallel surfaces. The first duct structure and second duct structure may be configured or oriented to reflect incident light having a first angle of reflection with respect to a first axis corresponding to a propagation direction of a respective duct structure and a second angle of reflection with respect to a second axis corresponding to a transverse dimension of the propagation direction. A second light coupling device may be disposed between the first waveguide surface and the second waveguide surface. The second light coupling device may be configured or structured to couple the reflected light of the first light coupling device.

Some examples of the HMD device or system described above may also include a second volume holographic light coupling element (e.g., skew mirror 110) disposed between the first waveguide surface and the second waveguide surface. The second volume holographic light coupling element may have a second reflective axis oriented different from the first reflective axis.

Figure 2A:
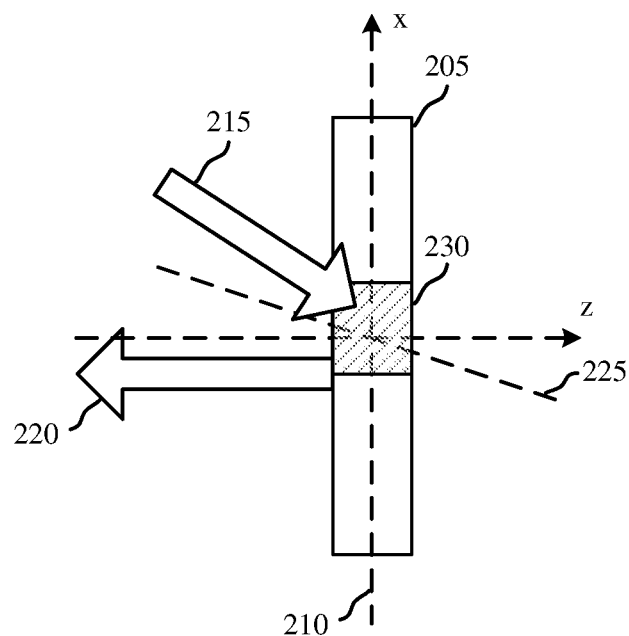
FIG. 2A is a diagram illustrating reflective properties of a skew mirror in real space in accordance with various aspects of the present disclosure.

FIG. 2A is a cross-section view 200 illustrating reflective properties of a skew mirror 205 in real space according to one example. The cross-section view 200 may include a grating structure such as hologram 230 in a grating medium. FIG. 2A omits skew mirror components other than the grating medium, such as an additional layer that might serve as a substrate or protective layer for the grating medium. The substrate or protective layer may serve to protect the grating medium from contamination, moisture, oxygen, reactive chemical species, damage, and the like. Implementations of a skew mirror for pupil equalization may be partially reflective. In this manner, one or more skew mirrors for pupil equalization may be configured or structured to selectively reflect the rays of light to various portions of an optical device (e.g., redirecting light toward a waveguide in an input coupler configuration, redirecting light propagating in a TIR mode within an waveguide in a cross coupler configuration, and/or forming an exit pupil towards an eye box of the optical device). The skew mirror for pupil equalization may be configured to avoid reflecting the rays of light for certain incidence angles, where such a reflection would reflect the rays of light to an area that is not toward the desired exit pupil. Implementations of some skew mirror embodiments may require a relatively high dynamic range recording medium to achieve high reflectivity over a relatively wide wavelength bandwidth and angle range for the resulting grating medium. By contrast, a skew mirror for pupil equalization may require less dynamic range thereby allowing each hologram to be stronger (e.g., recorded with a greater intensity and/or longer exposure time). A skew mirror composed of stronger holograms may provide a brighter image, or allow a dimmer light projector to provide an image of similar brightness. The skew mirror 205 may be characterized by reflective axis 225, at an angle measured with respect to the z-axis. The z-axis may be normal to the skew mirror surface. The skew mirror 205 is illuminated with the incident light 215 with an internal incidence angle that is measured with respect to the z-axis. The principal reflected light 220 may be reflected with internal reflection angle 180° measured with respect to the z-axis. The principal reflected light 220 may correspond to wavelengths of light residing in the red, green, and blue regions of the visible spectrum.

The skew mirror 210 may be characterized by the reflective axis 225, at an angle measured with respect to the z-axis. The z-axis is normal to the skew mirror 205 axis. The skew mirror 210 is illuminated with the incident light 215 with an internal incidence angle that is measured with respect to the z-axis. The principal reflected light 220 may be reflected with internal reflection angle axis substantially normal to the surface of skew mirror 210. In some examples, the principal reflected light 220 may correspond to wavelengths of light residing in the red, green, and blue regions of the visible spectrum. For example, the red, green, and blue regions of the visible spectrum may include a red wavelength (e.g., 610-780 nm) band, green wavelength (e.g., 493-577 nm) band, and blue wavelength (e.g., 405-492 nm) band. In other examples, the principal reflected light 220 may correspond to wavelengths of light residing outside of the visible spectrum (e.g., infrared and ultraviolet wavelengths).

The skew mirror 210 may have multiple hologram regions which all share substantially the same reflective axis 225. These multiple regions, however, may each reflect light for different ranges of angles of incidence. For example, the bottom third of a HOE containing the skew mirror 210 may only contain that subset of grating structures that reflects light upwards towards a corresponding eye box. The middle third may then reflect light directly towards the corresponding eye box. Then the top third need only contain the subset of grating structures which reflects light downwards to the corresponding eye box.

Figure 2B:
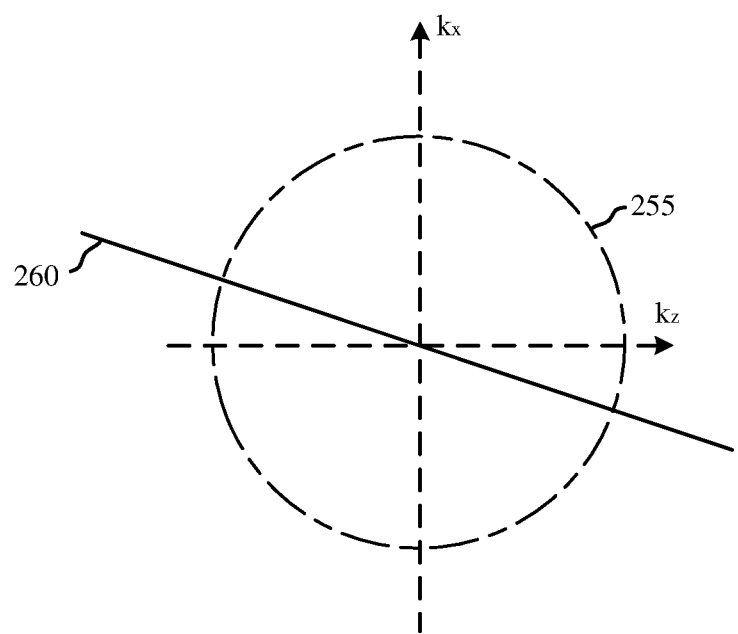
FIG. 2B illustrates a skew mirror in k-space in accordance with various aspects of the present disclosure.

FIG. 2B illustrates a k-space representation 250 of the skew mirror 210 of FIG. 2A. The k-space distributions of spatially varying refractive index components are typically denoted $\Delta n(\vec{k})$. $\Delta n(\vec{k})$ k-space distribution 260 may pass through the origin, at an angle equal to reflective axis 225, measured with respect to the z-axis. Recording k-sphere 255 may be the k-sphere corresponding to a particular writing wavelength. K-space representation 250 may include various k-spheres corresponding to wavelengths of light residing in the red, green, and blue regions of the visible spectrum.

The k-space formalism may represent a method for analyzing holographic recording and diffraction. In k-space, propagating optical waves and holograms may be represented by three dimensional Fourier transforms of their distributions in real space. For example, an infinite collimated monochromatic reference beam may be represented in real space and k-space by equation (1):

$$E_r(\vec{r}) = A_r \exp(i\vec{k}_r \cdot \vec{r}) \xrightarrow{\mathcal{F}} E_r(\vec{k}) = A_r \delta(\vec{k} - \vec{k}_r) \tag{1}$$

where $E_r(\vec{r}\,\vec{r})$ is the optical scalar field distribution at all $\vec{r} = \{x, y, z\}$ 3D spatial vector locations, and the transform $E_r(\vec{k})$ of the distribution, is the optical scalar field distribution at all $\vec{k} = \{k_x, k_y, k_z\}$ 3D spatial frequency vectors. $A_r$ may represent the scalar complex amplitude of the field; and $\vec{k}_r$ may represent the wave vector, whose length indicates the spatial frequency of the light waves, and whose direction indicates the direction of propagation. In some implementations, all beams may be composed of light of the same wavelength, so all optical wave vectors may have the same length, i.e., $|\vec{k}_r| = k_n$. Thus, all optical propagation vectors may lie on a sphere of radius $k_n = 2\pi n_0/\lambda$, where $n_0$ is the average refractive index of the hologram ("bulk index"), and $\lambda$ is the vacuum wavelength of the light. This construct is known as the k-sphere. In other implementations, light of multiple wavelengths may be decomposed into a superposition of wave vectors of differing lengths, lying on different k-spheres.

Another important k-space distribution is that of the holograms themselves. Volume holograms may consist of spatial variations of the index of refraction within a grating medium. The index of refraction spatial variations, typically denoted $\Delta n(\vec{r})$, can be referred to as index modulation patterns, the k-space distributions of which may be denoted $\Delta n(\vec{k})$. The index modulation pattern may be created by interference between a first recording beam and a second recording beam is typically proportional to the spatial intensity of the recording interference pattern, as shown in equation (2):

$$\Delta n(\vec{r}) \propto |E_1(\vec{r}) + E_2(\vec{r})|^2 = |E_1(\vec{r})|^2 + |E_2(\vec{r})|^2 + E_1^*(\vec{r})E_2(\vec{r}) + E_1(\vec{r})E_2^*(\vec{r}) \quad (2)$$

where is the spatial distribution of the signal first recording beam field and is the spatial distribution of the second recording beam field. The unary operator "*" denotes complex conjugation. The final term in equation (2), $E_1(\vec{r})E_2^*(\vec{r})$, may map the incident second recording beam into the diffracted first recording beam. Thus the following equation may result:

$$E_1(\vec{r})E_2^*(\vec{r}) \xrightarrow{\mathfrak{F}} E_1(\vec{k}) \otimes E_2(\vec{k}), \quad (3)$$

where $\otimes$ is the 3D cross correlation operator. This is to say, the product of one optical field and the complex conjugate of another in the spatial domain may become a cross correlation of their respective Fourier transforms in the frequency domain.

Typically, the hologram 230 constitutes a refractive index distribution that is real-valued in real space. Locations of k-space distributions of the hologram 230 may be determined mathematically from the cross-correlation operations $E_2(\vec{k}) \otimes E_1(\vec{k})$ and $E_1(\vec{k}) \otimes E_2(\vec{k})$, respectively, or geometrically from vector differences $K_{G+} = \vec{k}_1 - \vec{k}_2$ and $K_{G-} = \vec{k}_2 - \vec{k}_1$, where $K_{G+}$ and $K_{G-}$ may represent grating vectors from the respective hologram $\Delta n(\vec{k})$ k-space distributions to the origin (not shown individually). Note that by convention, wave vectors are represented by a lowercase "k," and grating vectors by uppercase "K."

Once recorded, the hologram 230 may be illuminated by a probe beam to produce a diffracted beam. For purposes of the present disclosure, the diffracted beam can be considered a reflection of the probe beam, which can be referred to as an incident light beam (e.g., image-bearing light). The probe beam and its reflected beam may be angularly bisected by the reflective axis 225 (i.e., the angle of incidence of the probe beam relative to the reflective axis has the same magnitude as the angle of reflection of the reflected beam relative to the reflective axis). The diffraction process can be represented by a set of mathematical and geometric operations in k-space similar to those of the recording process. In the weak diffraction limit, the diffracted light distribution of the diffracted beam is given by equation (4), $$E_d(\vec{k}) \propto \Delta n(\vec{k}) * E_p(\vec{k}) \big|_{|\vec{k}|=k_n}, \quad (4)$$

where $E_d(\vec{k})$ and $E_p(\vec{k})$ are k-space distributions of the diffracted beam and the probe beam, respectively; and "*" is the 3D convolution operator. The notation " " indicates that the preceding expression is evaluated only where, i.e., where the result lies on the k-sphere. The convolution represents a polarization density distribution, and is proportional to the macroscopic sum of the inhomogeneous electric dipole moments of the grating medium induced by the probe beam.

In some cases, when the probe beam resembles one of the recording beams used for recording, the effect of the convolution may be to reverse the cross correlation during recording, and the diffracted beam may substantially resemble the other recording beam used to record a hologram. When the probe beam has a different k-space distribution than the recording beams used for recording, the hologram may produce a diffracted beam that is substantially different than the beams used to record the hologram. Note also that while the recording beams are typically mutually coherent, the probe beam (and diffracted beam) is not so constrained. A multi-wavelength probe beam may be analyzed as a superposition of single-wavelength beams, each obeying Equation (4) with a different k-sphere radius.

Persons skilled in the art given the benefit of the present disclosure will recognize that the term probe beam, used when describing skew mirror properties in k-space, is analogous to the term incident light, which is used when describing skew mirror reflective properties in real space. Similarly, the term diffracted beam, used when describing skew mirror properties in k-space, is analogous to the term principal reflected light, used when describing skew mirror properties in real space. Thus when describing reflective properties of a skew mirror in real space, it may be typical to state that incident light is reflected by a hologram (or other grating structure) as principal reflected light, though to state that a probe beam is diffracted by the hologram to produce a diffracted beam is synonymous. Similarly, when describing reflective properties of a skew mirror in k-space, it is typical to state that a probe beam is diffracted by a hologram (or other grating structure) to produce a diffracted beam, though to state that incident light is reflected by the grating structure to produce principal reflected light has the same meaning in the context of implementations of the present disclosure.

Figure 3:
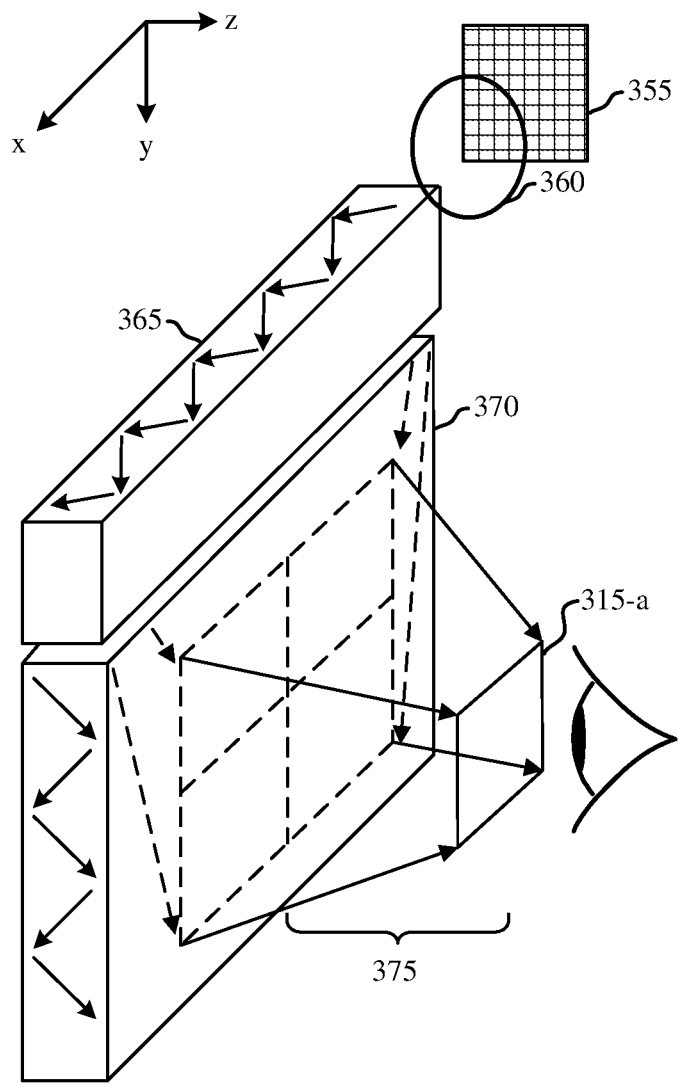
FIG. 3 is a diagram of an optical system incorporating skew mirror exit pupil expansion techniques in accordance with various aspects of the present disclosure.

FIG. 3 is a diagram of an optical system incorporating two-dimensional skew mirror exit pupil expansion techniques in accordance with various aspects of the disclosure. In some cases, the optical system may incorporate one or more skew mirrors for directing incident light beams (e.g., modes) of an input pupil for external projection. In other cases, one or more duct structures may be oriented and configured for directing incident modes of an input pupil within at least one of waveguide 365 and waveguide 370, for external projection. The one or more duct structures may be implemented with one or more skew mirrors for providing an exit pupil at the eye box 315-*a*. Optical system 300 may be utilized in an HMD, augmented reality (AR), or virtual reality (VR) application such as, but not limited to, the HMD 100 of FIG. 1. Optical system 300 may also be utilized in various optical coupling applications such as, but not limited to, large screen display and optical sensor applications. In some cases the optical system 300 may include one or more volume holographic elements within a grating medium of the one or more skew mirrors, as a means to perform selective coupling to allow the one or more skew mirrors to diffract light towards a specific location, such as an eye box 315-*a*, thereby improving photometric efficiency (e.g., image brightness). Additionally or alternatively, the optical system 300 may include reflective coating elements within substrate components of the one or more duct structures, as a means to provide selective coupling, thereby promoting uniform output pupil intensity (e.g., constant pupil brightness). Selective coupling may have an advantageous effect of producing an external exit pupil at the eye box 315-*a*. The exit pupil may be a fixed distance from the skew mirror 305. An external exit pupil may increase optical efficiency relative to an internal exit pupil. The represented angles are internal angles relative to the surface normal of the grating medium, and that refraction at the grating medium and/or the substrate interface, as well as at the substrate air interface, is ignored for the purpose of illustration.

Optical system 300 may include a display 355, a collimator 360, a horizontal waveguide 365, a vertical waveguide 370, and an eye box 315-*a*. Eye box 315-*a* may be a distance from the vertical waveguide 370 hereby known as the eye relief 375. Optical system 300 illustrates an example of a two-dimensional pupil expander that may utilize skew mirrors. A skew mirror disposed in horizontal waveguide 365 may be referred to as a cross coupler. In some cases, a skew mirror disposed in the vertical waveguide 370 may be referred to as an output coupler.

In some cases, the exit pupil expansion techniques as described may be used to provide two-dimensional pupil expansion by utilizing two skew mirrors. For example, a horizontal waveguide 365 may include a first skew mirror that is operatively coupled to a second skew mirror. The first skew mirror may be used to expand the pupil in a horizontal direction. In some examples, the first skew mirror (e.g., a cross coupler) may be disposed within a separate 2D (duct-type) waveguide. The second skew mirror may be used to expand the pupil in a vertical direction. In some examples, the second skew mirror (e.g., an output coupler) may be disposed within a separate 1D (slab-type) waveguide. In some examples, the first skew mirror (e.g., a cross coupler) and the second skew mirror (e.g., an output coupler) may be disposed within a single 1D (slab-type) waveguide. In some examples, the first skew mirror and the second skew mirror may abut or be otherwise operatively coupled vertically (e.g., along the y-axis). In some examples, the first skew mirror and the second skew mirror may abut or be otherwise operatively coupled horizontally (e.g., along the x-axis). In some examples, the first skew mirror and the second skew mirror may abut or be otherwise operatively coupled in an overlapping manner (e.g., along the z-axis).

In some examples, the first skew mirror (e.g., a cross coupler) may employ selective coupling to implement the exit pupil equalization techniques as described herein. In some examples, the second skew mirror (e.g., an output coupler) may independently employ selective coupling to implement the exit pupil equalization techniques as described herein.

In other cases, the exit pupil expansion techniques as described may be used to provide two-dimensional pupil expansion by utilizing one or more duct structures with skew mirrors. For example, a horizontal waveguide 365 may include one or more duct structures oriented and joined to form a first coupling mechanism (e.g., a cross coupler). The first coupling mechanism may be operatively intercoupled to a first skew mirror. The one or more duct structures may be used to expand the pupil in the horizontal direction. The first skew mirror may be used to expand the pupil in a vertical direction. In some examples, the first skew mirror (e.g., an output coupler) may be disposed within a separate 1D (slab-type) waveguide. In some examples, the coupling mechanism containing the one or more duct structures (e.g., a cross coupler) and the first skew mirror (e.g., an output coupler) may be disposed within a single 1D (slab-type) waveguide. In some examples, the one or more duct structures and the first skew mirror may abut or be otherwise operatively coupled vertically (e.g., along the y-axis). In some examples, the one or more duct structures and the first skew mirror may abut or be otherwise operatively coupled horizontally (e.g., along the x-axis). In some examples, the one or more duct structures and the first skew mirror may abut or be otherwise operatively coupled in an overlapping manner (e.g., along the z-axis).

In some examples, the contained one or more duct structures, as oriented, (e.g., a cross coupler) may employ selective coupling to implement the exit pupil equalization techniques as described herein. In some examples, the first skew mirror (e.g., an output coupler) may independently employ selective coupling to implement the exit pupil equalization techniques as described herein.

Figure 4:
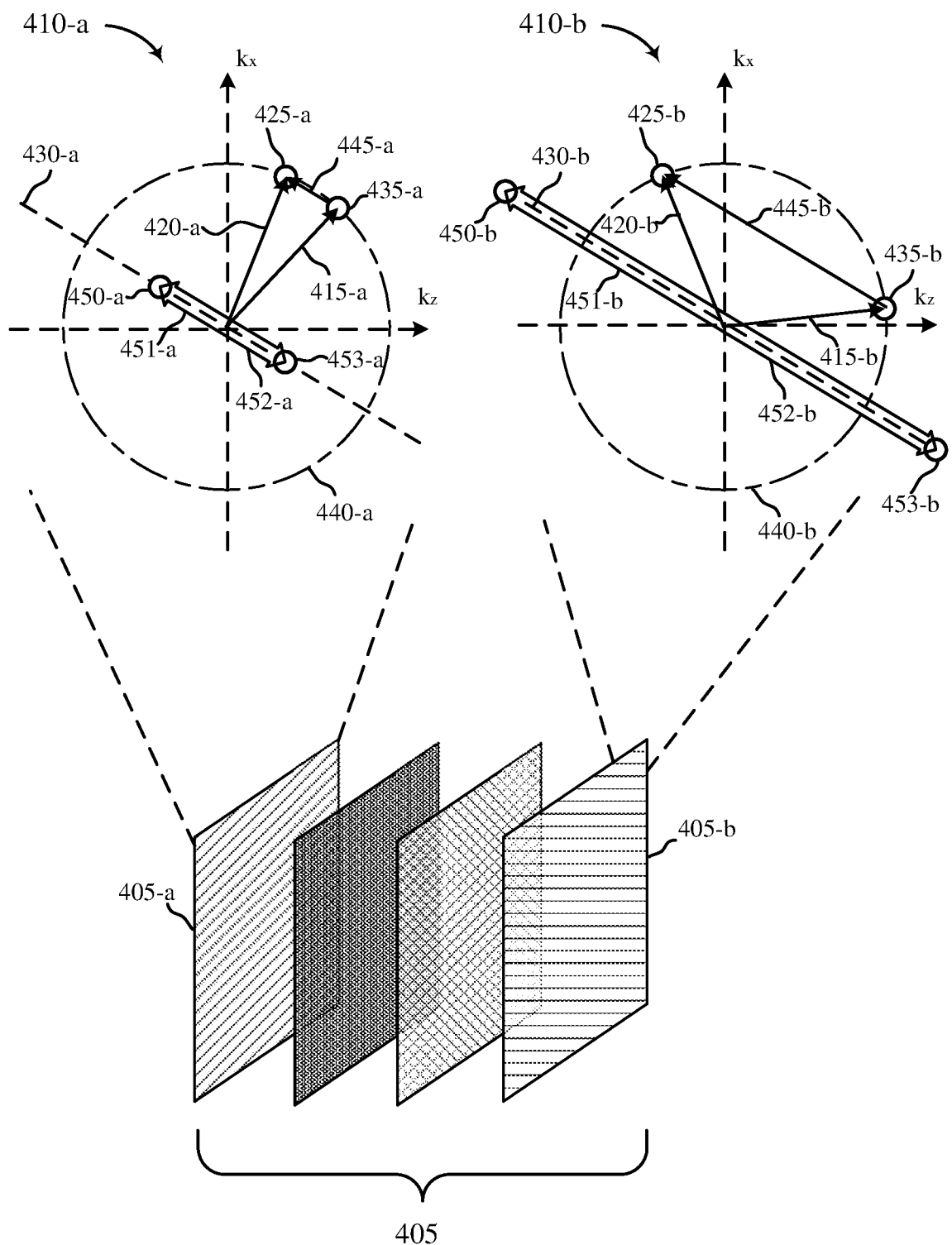
FIG. 4 is a diagram of an optical component illustrating a plurality of grating structures in accordance with various aspects of the present disclosure.

FIG. 4 is a diagram of an optical component 400 illustrating a plurality of grating structures 405. Grating structures 405 may be similar to the grating structures with a grating medium described herein. Grating structures 405 are illustrated in an exploded view manner for discussion purposes, but these grating structures 405 may overlap and intermingle within a volume or space of a grating medium as described herein. Also, each grating structure may have a different diffraction angle response and may reflect light at a wavelength that is different than another grating structure.

Optical component 400 depicts a grating structure 405-*a* and a grating structure 405-*b*. The grating structure 405-*a* may have a corresponding k-space diagram 410-*a*, and the grating structure 405-*b* may have a corresponding k-space diagram 410-*b*. The k-space diagrams 410-*a* and 410-*b* may illustrate cases of Bragg-matched reconstruction by illuminating a hologram.

The k-space diagram 410-*a* may illustrate the reflection of an incident light by the grating structure 405-*a*. The k-space diagram 410-*a* is a representation of a mirror-like diffraction (which can be referred to as a reflection) of the probe beam by the hologram, where the probe beam angle of incidence with respect to the reflective axis is equal to the diffracted beam angle of reflection with respect to the reflective axis. The k-space diagram 410-*a* may include positive sideband $\Delta n(\vec{k})$ k-space distribution 450-*a* that has an angle measured with respect to the z-axis, equal to that of the reflective axis 430-*a* of the grating structure 405-*a*. The k-space diagram 410-*a* may also include a negative sideband $\Delta n(\vec{k})$ k-space distribution 453-*a* that has an angle measured with respect to the z-axis, equal to that of the reflective axis 430-*a*. The k-sphere 440-*a* may represent visible blue light, visible green light, or visible red light.

The k-space diagram 410-*a* depicts a case where probe beam 435-*a* produces a diffracted beam k-space distribution 425-*a*, $E_d(\vec{k})$, that is point-like and lies on the probe beam 440-*a* k-sphere. The diffracted beam k-space distribution 425-*a* is produced according to the convolution of Equation (4).

The probe beam may have a k-space distribution 435-*a*, $E_p(\vec{k})$, that is also point-like. In this case, the probe beam is said to be "Bragg-matched" to the hologram, and the hologram may produce significant diffraction, even though the probe beam wavelength differs from the wavelength of the recording beams used to record the hologram. The convolution operation may also be represented geometrically by the vector sum $\vec{k}_d = \vec{k}_p + K_{G+}$, where $\vec{k}_d$ represents a diffracted beam wave vector 420-*a*, $\vec{k}_p$ represents a probe beam wave vector 415-*a*, and K$_{G+}$ represents a positive sideband grating vector 451-*a*. Vector 445-*a* represents the sum of the probe beam wave vector 415-*a* and the positive sideband grating vector 451-*a* according to the convolution of Equation (4). The k-space diagram 410-*a* also has a negative sideband grating vector 452-*a*.

The probe beam wave vector 415-*a* and the diffracted beam wave vector 420-*a* may form the legs of a substantially isosceles triangle. The equal angles of this triangle may be congruent with the angle of incidence and angle of reflection, both measured with respect to the reflective axis 430-*a*. Thus, the grating structure 405-*a* may reflect light in a substantially mirror-like manner about the reflective axis 430-*a*.

The k-space diagram 410-*b* may illustrate the reflection of an incident light by the grating structure 405-*b*. The grating structure 405-*b* may reflect incident light at a plurality of incidence angles that are different than the incidence angles reflected by the grating structure 405-*a*. The grating structure 405-*b* may also reflect light at a different wavelength than the grating structure 405-*a*. The k-space diagram 410-*b* may be a representation of a mirror-like diffraction (which can be referred to as a reflection) of the probe beam by the hologram, where the probe beam angle of incidence with respect to the reflective axis is equal to the diffracted beam angle of reflection with respect to the reflective axis. The k-space diagram 410-*b* has a positive sideband Δn($\vec{k}$) k-space distribution 450-*b* that has an angle measured with respect to the z-axis, equal to that of the reflective axis 430-*b* of grating structure 405-*b*. The k-space diagram 410-*b* also has a negative sideband Δn($\vec{k}$) k-space distribution 453-*b* that has an angle measured with respect to the z-axis, equal to that of the reflective axis 430-*b*. The k-sphere 440-*b* may represent visible blue light, visible green light, or visible red light. In some embodiments, the k-sphere may represent other wavelengths of electromagnetic radiation, including but not limited to ultraviolet or infrared wavelengths.

The k-space diagram 410-*b* depicts a case where the probe beam 435-*b* produces a diffracted beam k-space distribution 425-*b*, E$_d$($\vec{k}$), that is point-like and lies on the probe beam 440-*b* k-sphere. The diffracted beam k-space distribution 425-*b* is produced according to the convolution of Equation (4).

The probe beam 435-*b* has a k-space distribution, E$_p$($\vec{k}$), that is also point-like. In this case, the probe beam is said to be "Bragg-matched" to the hologram, and the hologram may produce significant diffraction, even though the probe beam wavelength differs from the wavelength of the recording beams used to record the hologram. The convolution operation may also be represented geometrically by the vector sum $\vec{k}_d = \vec{k}_p + K_{G+}$, where $\vec{k}_d$ represents a diffracted beam wave vector 420-*b*, $\vec{k}_p$, represents a probe beam wave vector 415-*b*, and K$_{G+}$ represents a positive sideband grating vector 451-*b*. Vector 445-*b* represents the sum of the probe beam wave vector 415-*b* and the positive sideband grating vector 451-*b* according to the convolution of Equation (4). The k-space diagram 410-*b* also has a negative sideband grating vector 452-*b*.

The probe beam wave vector 415-*b* and the diffracted beam wave vector 420-*b* may form the legs of a substantially isosceles triangle. The equal angles of this triangle may be congruent with the angle of incidence and angle of reflection, both measured with respect to the reflective axis 430-*b*. Thus, the grating structure 405-*b* may reflect light in a substantially mirror-like manner about the reflective axis 430-*b*.

Figure 5A:
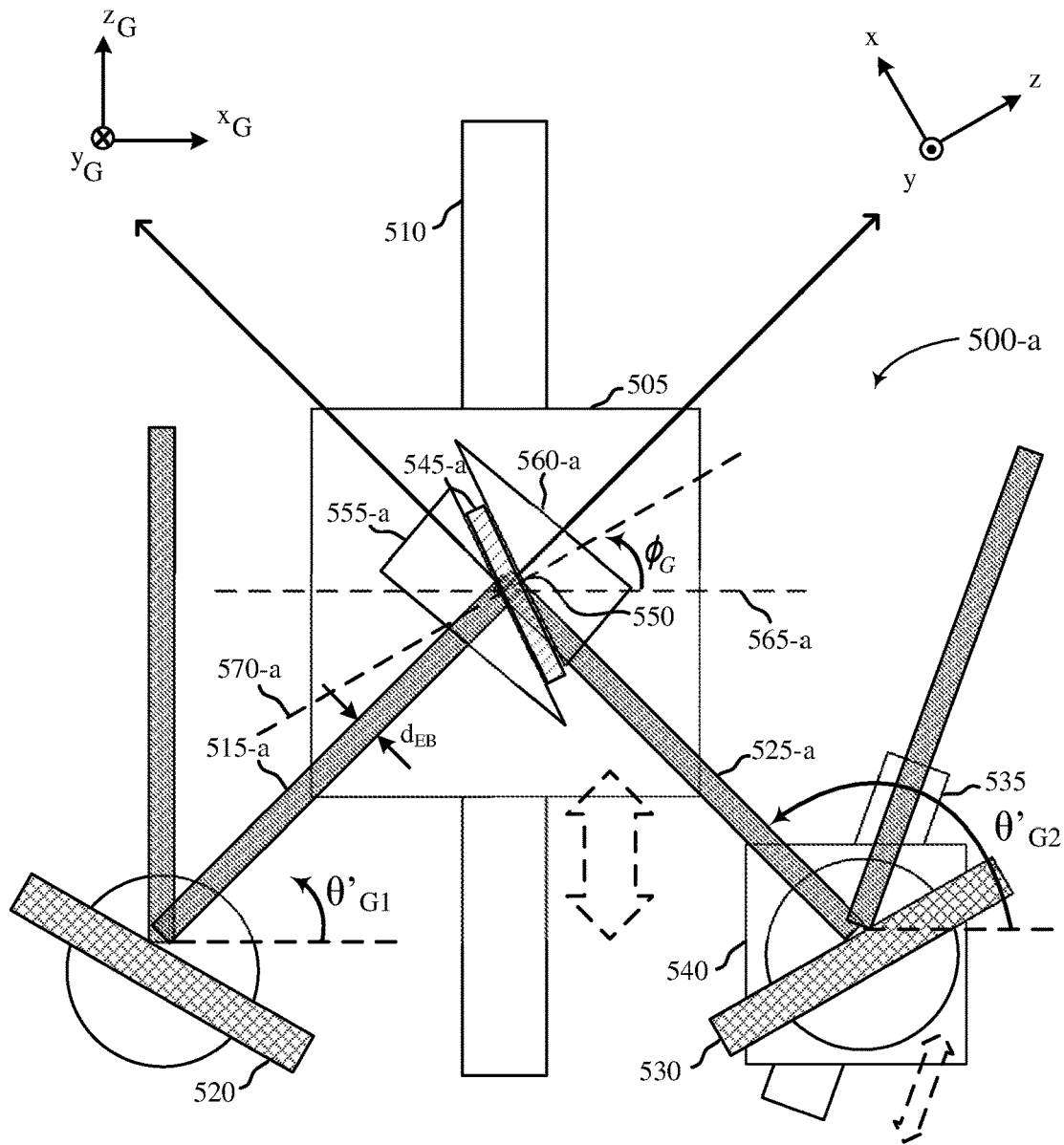
FIG. 5A illustrates a diagram of a system that can be used to manufacture a skew mirror with pupil expansion in accordance with various aspects of the present disclosure.

FIG. 5A is a system 500-*a* for manufacturing a skew mirror with pupil equalization in accordance with various aspects of the disclosure. System 500-*a* may include a sample stage carrier 505, a sample carrier rail 510, a first recording beam 515-*a*, a signal mirror 520, a second recording beam 525-*a*, a reference mirror 530, a reference mirror carrier rail 535, a reference mirror carrier 540, a grating medium 545-*a*, a hologram 550, a first prism 555-*a*, and a second prism 560-*a*.

System 500-*a* may include global coordinates (xG, yG, zG) and skew mirror coordinates (x, y, z). The origin may be defined to be in the center of the grating medium 545-*a*. In some cases, the grating medium 545-*a* may comprise a generally rectangular shape where 'z' corresponds to the thickness of the grating medium 545-*a*, 'x' corresponds to the length of the in-plane side of the grating medium 545-*a*, and 'y' corresponds to the length of the in-plane side of the grating medium 545-*a*. The global angle for recording, θG, may be defined as the angle of the first recording beam 515-*a* with respect to the xG-axis inside grating medium 545-*a*. Skew mirror coordinates (x, y, z) may be converted to global coordinates by the following equation:

$$\begin{bmatrix} x_G \\ y_G \\ z_G \end{bmatrix} = \begin{bmatrix} \sin\phi_G & 0 & \cos\phi_G \\ 0 & -1 & 0 \\ \cos\phi_G & 0 & -\sin\phi_G \end{bmatrix} \begin{bmatrix} x \\ y \\ z \end{bmatrix} \quad (5)$$

The system 500-*a* may be used to configure recording beams to have a size approximately equal to a desired eye box size. In an implementation, the system 500-*a* may dispose rotating mirrors such as the signal mirror 520 and the reference mirror 530 to create the correct angles for the first recording beam 515-*a* and the second recording beam 525-*a*. The angle of the signal mirror 520 may be changed to produce a desired angle (θG1) of first recording beam 515-*a* with width ~dEB. The sample stage carrier 505 and the reference mirror carrier 540 may be positioned so as to illuminate the correct location with the recording beams for each exposure. The sample stage carrier 505 of the system 500-*a* may be positioned on the sample carrier rail 510 to facilitate the illumination of the grating medium 545-*a* with the first recording beam 515-*a* in the desired location. The reference mirror carrier 540 may be positioned on the reference mirror carrier rail 535 to facilitate the illumination of the grating medium 545-*a* with the second recording beam 525-*a* in the desired location. The grating medium 545-*a* may be referred to as a recording medium prior to or during hologram recording, and may include a photopolymer. In some embodiments, the grating medium may comprise photorefractive crystals, dichromatic gelatin, photo-thermo-refractive glass, and/or film containing dispersed silver halide particles.

With the rotation of the signal mirror 520 and the reference mirror 530 set, the mirrors may be arranged to direct the first recording beam 515-*a* and the second recording beam 525-*a* such that the recording beams intersect and interfere with each other to form an interference pattern that is recorded as a hologram 550 in the grating medium 545-*a*. The hologram 550 may be an example of a grating structure. The system 500-*a* may form multiple grating structures, each configured to reflect light of a particular wavelength about the skew axis 565-*a* at a plurality of incidence angles.

Each grating structure may be formed using a plurality of exposures of the grating medium 545-*a* to coherent light having a particular wavelength. The plurality of incidence angles corresponding to each grating structure may be offset from one another by a minimum range of angles.

In some implementations, the recording beams may have widths that differ from each other, or they may be the same. The recording beams may each have the same intensity as each other, or intensity can differ among the beams. The intensity of the beams may be non-uniform. The grating medium 545-*a* is typically secured in place between the first prism 555-*a* and the second prism 560-*a* using a fluid index matched to both the prisms and the grating medium. A skew axis 565-*a* resides at a skew angle relative to the surface normal 570-*a*. As depicted in FIG. 5A, skew angle may be −30.25 degrees relative to the surface normal 570-*a*. The angle between the first and second recording beams may reside in a range from 0 to 180 degrees. The recorded skew angle relative to surface normal 570-*a* then becomes $\phi' = (\theta_{R1}+\theta_{R2}-180°)/2+\phi_G$ for in-plane system 500-*a*. For the nominal case where $\theta_{G2}=180°-\theta_{G1}$, $\phi'=\phi_G$. In FIG. 5, $\phi_G$ shows the nominal skew angle relative to surface normal. Additionally, in FIG. 5, the exact depiction of angles of $\theta_{G1}$ and $\theta_{G2}$ are not shown. The angles of $\theta'_{G1}$ and $\theta'_{G2}$ are illustrated and correspond to the angles of $\theta_{G1}$ and $\theta_{G2}$. The angles of $\theta_{G1}$ and $\theta_{G2}$ are in relation to the first recording beam 515-*a* and the second recording beam 525-*a* beam, respectively, within the first prism 555-*a* and the second prism 560-*a*. The angles of $\theta'_{G1}$ and $\theta'_{G2}$ will be different from angles of $\theta_{G1}$ and $\theta_{G2}$ because of an index of refraction mismatch at the boundary between air and the prisms when the recording beams enter the prisms (e.g., the effects of Snell's Law or the law of refraction).

The first recording beam 515-*a* and the second recording beam 525-*a* may be nominally symmetrical about the skew axis 565-*a* such that the sum of first recording beam internal angle relative to the skew axis and the second recording beam internal angle relative to the skew axis equates to 180 degrees. Each of the first and second recording beams may be collimated plane wave beams originating from a laser light source.

Refraction at air/prism boundaries, for example where the first recording beam 515-*a* intersects an air/prism boundary of the first prism 555-*a* and where the second recording beam 525-*a* intersects an air/prism boundary of the second prism 560-*a*, is shown figuratively rather than strictly quantitatively. Refraction at the prism/grating medium boundary may also occur. In implementations, the grating medium and prisms each have an index of refraction of approximately 1.5471 at the recording beam wavelength of 405 nm.

A skew angle for a hologram (including a mean skew angle for a collection of holograms) can be substantially identical to a reflective axis angle, meaning the skew angle or mean skew angle is within 1.0 degree of the reflective axis angle. Given the benefit of the present disclosure, persons skilled in the art will recognize that the skew angle and reflective axis angle can be theoretically identical. However, due to limits in system precision and accuracy, shrinkage of recording medium that occurs during recording holograms, and other sources of error, the skew angle or mean skew angle as measured or estimated based on recording beam angles may not perfectly match the reflective axis angle as measured by incidence angles and reflection angles of light reflected by a skew mirror. Nevertheless, a skew angle determined based on recording beam angles can be within 1.0 degree of the reflective axis angle determined based on angles of incident light and its reflection, even where medium shrinkage and system imperfections contribute to errors in estimating skew angle and reflective axis angle. It is understood that these medium shrinkage and system imperfections can be made arbitrarily small in the manufacture of skew mirrors with pupil equalization. In this regard, these medium shrinkage and system imperfections may be considered analogous to flatness of an ordinary or conventional mirror. In some examples, a fundamental limit associated with the manufacture of skew mirrors using volume holograms may be based on thickness of the recording medium.

A skew axis/reflective axis is generally called a skew axis when referring to making a skew mirror (for example when describing recording a hologram in a skew mirror grating medium), and as a reflective axis when referring to light reflective properties of a skew mirror. A skew angle for a hologram (including a mean skew angle for a collection of holograms) can be substantially identical to a reflective axis angle, meaning the skew angle or mean skew angle is within 1.0 degree of the reflective axis angle. Persons skilled in the art given the benefit of the present disclosure will recognize that the skew angle and reflective axis angle can be theoretically identical. However, due to limits in system precision and accuracy, shrinkage of recording medium that occurs during recording holograms, and other sources of error, the skew angle or mean skew angle as measured or estimated based on recording beam angles may not perfectly match the reflective axis angle as measured by incidence angles and reflection angles of light reflected by a skew mirror. Nevertheless, a skew angle determined based on recording beam angles can be within 1.0 degree of the reflective axis angle determined based on angles of incident light and its reflection, even where medium shrinkage and system imperfections contribute to errors in estimating skew angle and reflective axis angle. Given the benefit of the present disclosure, persons skilled in the art will recognize that the skew angle for a given hologram is the same as the grating vector angle for that hologram.

In a variation of the system 500-*a*, a variable wavelength laser may be used to vary the wavelength of the first and second recording beams. Incidence angles of the first and second recording beams may be, but are not necessarily, held constant while the wavelength of the first and second recording beams is changed. Wavelengths may be comprised of visible red light wavelength, visible blue light wavelength, visible green light wavelength, ultraviolet (UV) wavelength, and/or infrared (IR) wavelength. Each grating structure of the system 500-*a* may reflect an incidence angle at a wavelength that is different than another grating structure. The system 500-*a* may have reflective properties that allow it to reflect light at a substantially different wavelength, and in particular a considerably longer wavelength, than the recording beam wavelength.

Figure 5B:
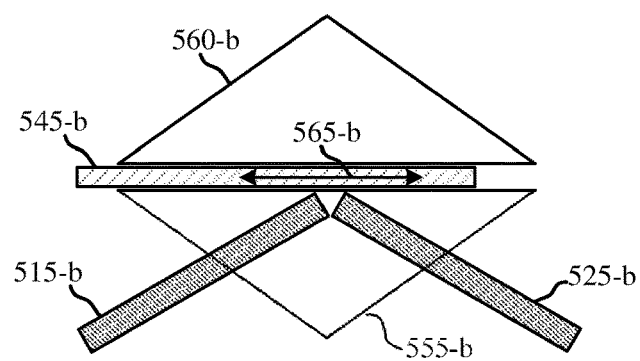
FIG. 5B illustrates a diagram of a system that can be used to manufacture a skew mirror with pupil expansion in accordance with various aspects of the present disclosure.

FIG. 5B is a system 500-*b* for manufacturing a skew mirror with pupil equalization in accordance with various aspects of the disclosure. System 500-*b* may include a first recording beam 515-*b*, a second recording beam 525-*b*, a grating medium 545-*b*, a first prism 555-*b*, a second prism 560-*b*, and skew axis 565-*b*. System 500-*b* may be an expanded view in reference to embodiments discussed in reference to FIG. 5A.

In some cases, one or more skew mirrors may be fabricated for a light coupling device used as a cross coupler. For example, each reflective axis may be either parallel or angularly offset to the surfaces of the one or more waveguides within the pupil expander. For example, a cross coupler having a crossed skew mirror cross coupler configuration may be fabricated by re-orienting the grating medium 545-*b* within the first prism 555-*b* and the second prism 560-*b*. In some recording implementations, the second prism 560-*b* may be omitted and replaced with a component for securing or stabilizing the grating medium 545-*b*. The component for securing or stabilizing the grating medium 545-*b* that may also include light absorbing characteristics. For example, the first recording beam 515-*b* and the second recording beam 525-*b* may both enter the first prism 555-*b* when configuring a cross coupler.

In some cases, a second skew mirror orientation may be recorded on the re-oriented grating medium 545-*b*. The second skew mirror may be oriented in an at least partially overlapping, or non-overlapping manner with the first skew mirror. Thus, a cross skewed mirror configuration is formed in a given volume of the grating medium 545-*b* (i.e., the recording medium after reorienting and curing processes). The re-orienting process may be repeated to record all desired skew axes of the light coupling device. In some cases, the second skew mirror may be oriented in a non-overlapping manner with the first skew mirror.

Figure 6:
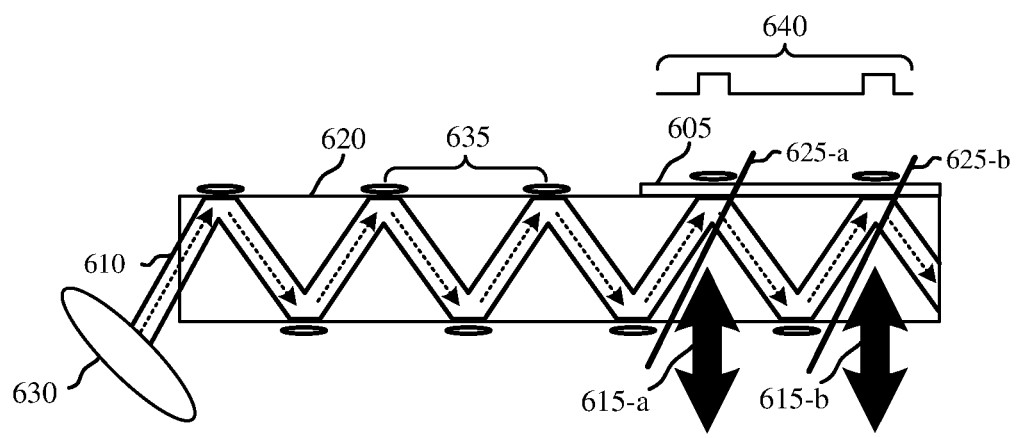
FIG. 6 illustrates an example of an optical system that supports duct pupil expansion in accordance with aspects of the present disclosure.

FIG. 6 illustrates an example of an optical system 600 that supports duct pupil expansion in accordance with various aspects of the present disclosure. Optical system 600 may be utilized in an application such as, but not limited to, an HMD device. The optical system 600 may employ selective coupling to allow a light coupling device 605 to reflect light 610 towards a specific location and project replicated pupils 615-*a* and 615-*b*. The represented angles are internal angles relative to the surface normal of the waveguide 620, and the refraction at the substrate interface, as well as at the substrate air interface, is ignored for the purpose of illustration. Replicated pupils 615-*a* and 615-*b* may project an image corresponding to reflective axis 625-*a* and 625-*b*, respectively. Light coupling device 605 may include a grating medium and a grating structure within the grating medium. The grating structure may have a plurality of holograms or sinusoidal volume gratings.

Optical system 600 illustrates a light source 630 where light 610 enters the waveguide 620. Light 610 may propagate in a TIR mode in the waveguide 620 from another portion of the optical system 600. In order for light 610 to be reflected towards the light coupling device 605 and project replicated pupils 615-*a* and 615-*b*, light 610 may propagate through the waveguide 620 by total internal reflection. For example, light 610 may propagate through waveguide 620 and reflect between a downward mode direction and an upward mode direction. Light 610 may be an example of light from one pixel (e.g., an image point) and have a corresponding width (e.g., the pupil width). In some examples, light 610 may be an example of light from multiple pixels.

Light 610 may be characterized as fully homogenized when replicated pupils 615-*a* and 615-*b* are substantially equivalent to an in-coupled pupil, and adjacent throughout light coupling device 605. Thus, homogenization may correspond to an absence of overlap or gaps between each of replicated pupils 615-*a* and 615-*b*. In some cases, reflected light 610 in a TIR device may experience mode inhomogeneity. For example, gap 635 caused by TIR modes (e.g., spatial modes along a direction of propagation) of the light may be present between the consecutive interactions of light and the surface of the waveguide. In some cases, propagating light 610 having large angles of incidence with respect to surface normal of waveguide 620 may increase the size of gap 635 between the interaction of light 610 and waveguide 620. Depending on a size of gap 635 caused by coupled mode of light 610, light 610 reflecting within waveguide 620 may only partially interact with light coupling device 605. This partial interaction in the non-overlapping mode inhomogeneity example of FIG. 6 may cause a non-uniform intensity profile at the light coupling device 605. The non-uniform intensity profile may result in a spatially-inhomogeneous power distribution 640. The spatially-inhomogeneous power distribution 640 may cause a broadening of the point spread function (PSF) of an output beam associated with replicated pupils of the light coupling device 605 thereby reducing the resolution of the projected image. In some examples, light homogenization techniques may be applied to optical system 600.

In some examples, light coupling device 605 may contain one or more duct structures for directing propagating light 610 through waveguide 620 for subsequent image projection at replicated pupils 615-*a* and 615-*b*. Each of the one or more duct structures may include one or more absorptive or reflective coating elements. The reflective coating elements may guide the reflected light at an angle of reflection distinct from, and transverse to, the angle of reflection corresponding to the propagation of light 610 through waveguide 620 by total internal reflection. The absorptive coating elements may inhibit stray light within the one or more duct structures as a means to improve photometric efficiency (e.g., image brightness) at the replicated pupils 615-*a* and 615-*b*. Additionally or alternatively, light coupling device 605 may include a grating medium and a grating structure within the grating medium. The grating structure may have a plurality of holograms or sinusoidal volume gratings.

Figures 7A, 7B, 7C:
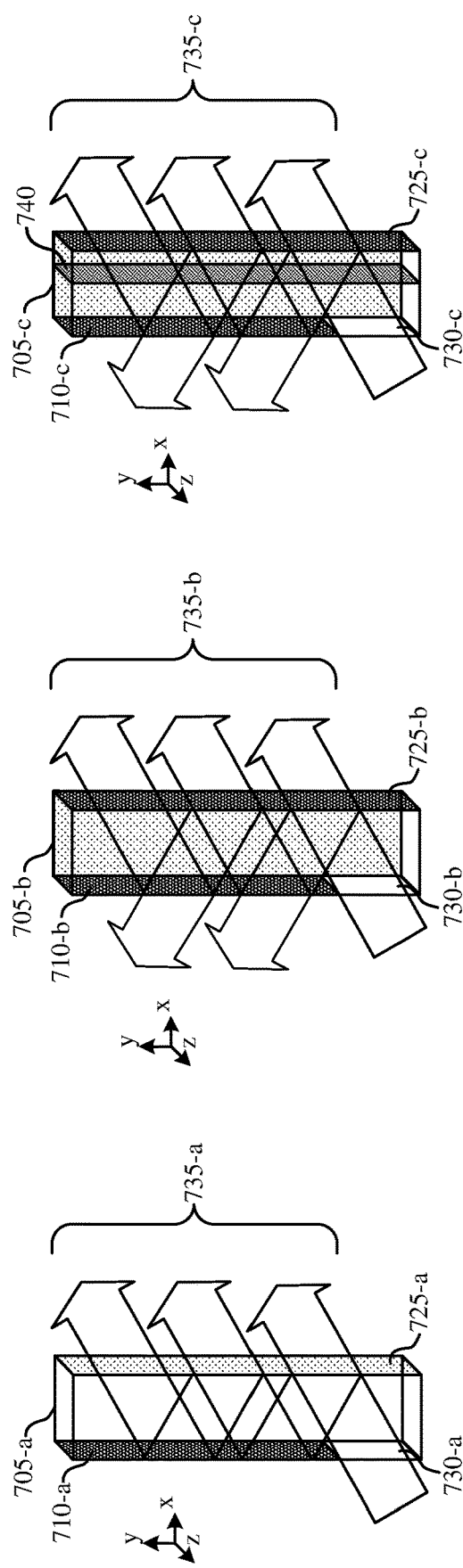
FIG. 7A illustrates an example of a duct structure that supports duct pupil expansion in accordance with various aspects of the present disclosure.
FIG. 7B illustrates an example of a duct structure that supports duct pupil expansion in accordance with various aspects of the present disclosure.
FIG. 7C illustrates an example of a duct structure that supports duct pupil expansion in accordance with various aspects of the present disclosure.

FIG. 7A illustrates an example of a duct structure 700-*a* that supports duct pupil expansion in accordance with various aspects of the present disclosure. In some configurations, duct structure 700-*a* may be implemented by HMD device 100 with reference to FIG. 1. In some configurations, duct structure 700-*a* may be implemented within waveguides 365 and 370 with reference to FIG. 3. Additionally or alternatively, duct structure 700-*a* may be an example of, or implemented within, aspects of optical system 600.

Duct structure 700-*a* may be disposed within an image projection system to at least emit an expanded output pupil 735-*a*. Duct structure 700-*a* may be fabricated from a single substrate (e.g., a piece of glass) and may include at least a surface 705-*a* and one or more parallel, planar regions 710-*a* and 725-*a*. Each of the planar regions 710-*a* and 725-*a* may sustain parallelism throughout the respective duct structure 700-*a* as a means to preserve image resolution. In addition, planar regions 710-*a* and 725-*a* may maintain perpendicularity to surface 705-*a*, exhibiting orthogonal corners within duct structure 700-*a* and preserving image resolution. Duct structure 700-*a* may contain alternate portions of the substrate that sustain a planar orientation adjacent to the intersection of planar regions 710-*a* and 725-*a* with surface 705-*a*. The alternate portions may be denoted as ends.

As described herein, at least one of planar region 710-*a*, planar region 725-*a*, and surface 705-*a* may implement one or more reflective coating elements. The implemented reflective coating elements may include a partial or fully reflective coating to sustain partial or complete light reflectivity, and thus sustain parallelism between light of input pupil 730-*a* and emitted output pupil 735-*a*. The reflective coatings may include metallic, dielectric, or similar coating surfaces, which may be spatially and/or angularly uniform or vary. In some cases, the coating may be used to provide uniform output intensity at output pupil 735-*a* (e.g., constant pupil brightness throughout the output light comprising the output pupil 735-*a*) according to uniform or varying incidence angles, wavelengths, polarizations, and the like. In some embodiments, the reflective coatings disposed at one or more of planar region 710-a, planar region 725-a, or surface 705-a may reflect input light at angles below the critical angle of the substrate (e.g., approximately 42 degrees for glass-to-air interface). The reflectivity may result in reduced pupil replication gaps for the pupil expansion. That is, neighboring beams of the output pupil 735-a may be directly adjacent to one another. In some cases, each end may be coated with an absorptive or reflective coating element as a means to at least mitigate stray light emission by duct structure 700-a.

One or more of planar region 710-a, planar region 725-a, surface 705-a, and the ends incorporated into the substrate material of duct structure 700-a may include a region or aperture for input pupil 730-a. The region may be uncoated or specially-coated to direct the incident light of input pupil 730-a through duct structure 700-a. Light of the input pupil 730-a may enter the aperture or region of duct structure 700-a. In some cases, the contained light modes of input pupil 730-a may be reflected by at least the implemented reflective coating elements of the parallel planar regions 710-a and 715-a incorporated within duct structure 700-a. The reflected light of input pupil 730-a may have a first angle of reflection within a total internal reflection (TIR) range with respect to an axis common to the propagation direction of duct structure 700-a. At least planar regions 710-a and 725-a may guide the reflected light of input pupil 730-a at a second angle of reflection with respect to a second, transverse axis to the propagation direction. The duct structures 700-a may then emit the reflected light beams (e.g., modes) as an output pupil 735-a for guided image projection. The incorporated reflective coatings of the planar regions 710-a and 725-a may sustain parallelism between the incident light of input pupil 730-a and the reflected modes from duct structure 700-a. In the case of one or more partially reflective coatings elements, the configuration of the coating elements may provide uniform output pupil intensity (e.g., constant pupil brightness) of the reflected light modes in accordance with uniform, or varying, incidence angle, wavelength, and polarization.

As illustrated in FIG. 7A, planar region 710-a may be coated with a fully reflective coating element and planar region 725-a may be coated with a partially reflective coating element. In some cases, the partially reflective coating element disposed at planar region 725-a may sustain reflectivity at low angles (e.g., 0° to 45°) with reference to surface normal in comparison to high angles (e.g., 45° to 90°) with reference to surface normal. As a result, planar region 725-a may vary the reflectivity of input pupil 730-a in one more propagation directions, thus sustaining angle equality throughout duct structure 700-a. Planar regions 710-a and 725-a may sustain parallelism throughout duct structure 700-a and guide light of the input pupil 730-a in a transverse dimension to the propagation.

Input light modes comprising input pupil 730-a may enter duct structure 700-a via an aperture of planar region 710-a. In alternate embodiments, the aperture may be located at an alternative planar region (e.g., planar region 725-a), surface, or end of duct structure 700-a. The input light modes may propagate into duct structure 700-a and reflect at a first angle of reflection within a TIR range common to a first axis. In some cases, the first axis may correspond to a propagation direction of the waveguide. The reflective coatings of planar regions 710-a and 725-a may also reflect the light guide the light in a transverse (i.e., alternative to the total internal reflection (non TIR)) dimension common to a second, alter-native axis. The propagated light modes may then be emitted at surface 705-a as an expanded output pupil 735-a. The intensity of output pupil 735-a may be substantially uniform with sustained image fidelity and without replication gaps.

FIG. 7B illustrates an example of a duct structure 700-b that supports duct pupil expansion in accordance with various aspects of the present disclosure. In some configurations, duct structure 700-b may be implemented by HMD device 100 with reference to FIG. 1. In some configurations, duct structure 700-b may be implemented within waveguides 365 and 370 with reference to FIG. 3. Additionally or alternatively, duct structure 700-b may be an example of, or implemented within, aspects of optical system 600.

Duct structure 700-b may be disposed within an image projection system to at least emit an expanded output pupil 735-b. Duct structure 700-b may be fabricated from a single substrate (e.g., a piece of glass) and may include at least a surface 705-b and one or more parallel, planar regions 710-b and 725-b. Each of the planar regions 710-b and 725-b sustain parallelism throughout the respective duct structure 700-b as a means to preserve image resolution. In addition, planar regions 710-b and 725-b may maintain perpendicularity to surface 705-b, exhibiting orthogonal corners within duct structure 700-b, and preserving image resolution. Duct structure 700-b may contain alternate portions of the substrate that sustains a planar orientation adjacent to the intersection of planar regions 710-b and 725-b with surface 705-b. The alternate portions may be denoted as ends.

As described herein, at least one of planar region 710-b, planar region 725-b, and surface 705-b may implement one or more reflective coating elements. The implemented reflective coating elements may include a partial or fully reflective coating to sustain partial or complete light reflectivity, and thus sustain parallelism between light of input pupil 730-b and emitted output pupil 735-b. The reflective coatings may include metallic, dielectric, or similar coating surfaces, which may be spatially and/or angularly uniform or vary. In some cases, the coating may be used to provide uniform output intensity at output pupil 735-b (e.g., constant pupil brightness throughout the output light comprising the output pupil 735-b) according to uniform or varying incidence angles, wavelengths, polarizations, and the like. In some embodiments, the reflective coatings disposed at one or more of planar region 710-a, planar region 725-a, or surface 705-a may reflect input light at angles below the critical angle of the substrate (e.g., approximately 42 degrees for glass-to-air interface). The reflectivity may result in reduced pupil replication gaps for the pupil expansion. That is, neighboring beams of the output pupil 735-b may be directly adjacent to one another. In some cases, each end may be coated with an absorptive or reflective coating element as a means to at least mitigate stray light emission by duct structure 700-b.

One or more of planar region 710-b, planar region 725-b, surface 705-b, and the ends incorporated into the substrate material of duct structure 700-b may include a region or aperture for input pupil 730-b. The region or aperture may be uncoated or specially-coated to facilitate the input. Light of the input pupil 730-b may enter the aperture of duct structure 700-b. In some cases, the contained light modes of input pupil 730-b may be reflected by at least the implemented reflective coating elements of the parallel, planar regions 710-b and 715-b incorporated within duct structure 700-b. The reflected light of input pupil 730-b may have a first angle of reflection within a total internal reflection (TIR) range with respect to an axis common to the propagation direction of duct structure 700-b. At least planar regions 710-b and 725-b may guide the reflected light of input pupil 730-b at a second angle of reflection with respect to a second transverse axis to the propagation direction. The duct structures 700-b may then emit the reflected light modes as an output pupil 735-b for guided image projection. The incorporated reflective coatings of the planar regions 710-b and 725-b may sustain parallelism between the incident light of an input pupil 730-b and the reflected light output from duct structure 700-b. In the case of one or more partially reflective coatings elements, the configuration of the coating elements may provide uniform output pupil intensity (e.g., constant pupil brightness) of the reflected light modes in accordance with uniform, or varying, incidence angle, wavelength, and polarization.

As illustrated in FIG. 7B, surface coupled duct structure 700-b may include parallel, planar regions 710-b and 725-b. Each of planar regions 710-b and 725-b may be coated with a fully reflective coating element. Planar regions 710-b and 725-b may sustain parallelism throughout duct structure 700-b and include a surface 705-b perpendicular to both planar regions 710-b and 725-b as a means to sustain orthogonal corners within duct structure 700-b, and preserve image fidelity. Surface 705-b may be coated with a partially reflective coating. In some cases the reflective coating element of surface 705-b may be substantially uniform, at high reflectivity limits. For example, at high reflectivity limits, light emitted by surface 705-b may remain undepleted. In some cases, the reflective coating element at surface 705-b may be spatially-variable to increase output brightness while maintaining uniformity. Additionally or alternatively, reflectivity at surface 705-b may be angularly-variable to improve uniformity and/or implement pupil equalization. That is, the reflectivity may be spatially uniform with respect to an incident angle and/or wavelength of propagating light incident on surface 705-b. In some cases, an azimuth-of-incidence selective surface (e.g., a film layer) may be disposed at surface 705-b to reduce the propagation of wasted light through duct structure 700-b, and promote pupil equalization at the output pupil 735-b.

Input light modes comprising input pupil 730-b may enter duct structure 700-b via an aperture of planar region 710-b. In alternate embodiments, the aperture may be located at an alternative planar region (e.g., planar region 725-b), surface, or end of duct structure 700-b. The input light may propagate into duct structure 700-b and reflect at a first angle of reflection within a TIR range common to a first axis. In some cases, the first axis may be common to a propagation direction of duct structure 700-b. Planar regions 710-b and 725-b may guide the light modes of input pupil 730-b in a transverse (i.e. non-TIR) dimension of a second, alternative axis via the reflective coating elements disposed at planar regions 710-b and 725-b. The reflected light modes may be directed to the partially reflective coating of surface 705-b. Light modes transmitting through the partially reflective coating element of surface 705-b may constitute an expanded output pupil 735-b for projection. Output pupil 735-b may be composed of one or more replications of input pupil 730-b, without gaps between the replications. The intensity of output pupil 735-b may be substantially uniform with sustained image fidelity.

FIG. 7C illustrates an example of a duct structure 700-c that supports duct pupil expansion in accordance with various aspects of the present disclosure. In some configurations, duct structure 700-c may be implemented by HMD device 100 with reference to FIG. 1. In some configurations, duct structure 700-c may be implemented within waveguides 365 and 370 with reference to FIG. 3. Additionally or alternatively, duct structure 700-c may be an example of, or implemented within, aspects of optical system 600.

Duct structure 700-c may be disposed within an image projection system to at least emit an expanded output pupil 735-c. Duct structure 700-c may be fabricated from a single substrate (e.g., a piece of glass) and may include at least a surface 705-c and one or more parallel, planar regions 710-c and 725-c. Each of the planar regions 710-c and 725-c and each of the parallel surfaces 705-c may sustain parallelism throughout the respective duct structure 700-c as a means to preserve image resolution. In addition, planar regions 710-c and 725-c may maintain perpendicularity to surface 705-c, exhibiting orthogonal corners within duct structure 700-c and preserving image resolution. Duct structure 700-c may contain alternate portions of the substrate that sustain a planar orientation adjacent to the intersection of planar regions 710-c and 725-c with surface 705-c. The alternate portions may be denoted as ends.

As described herein, at least one of planar region 710-c, planar region 725-c, and surface 705-c may implement one or more reflective coating elements. The implemented reflective coating elements may include a partial or fully reflective coating to sustain partial or complete light reflectivity, and thus sustain parallelism between light of input pupil 730-c and emitted output pupil 735-c. The reflective coatings may include metallic, dielectric, or similar coating surfaces, which may be spatially and/or angularly uniform or vary. In some cases, the coating may be used to provide uniform output intensity at output pupil 735-c (e.g., constant pupil brightness throughout the output light comprising the output pupil 735-c) according to uniform or varying incidence angles, wavelengths, polarizations, and the like. In some embodiments, the reflective coatings disposed at one or more of planar region 710-a, planar region 725-a, or surface 705-a may reflect input light at angles below the critical angle of the substrate (e.g., approximately 42 degrees for glass-to-air interface). The reflectivity may result in reduced pupil replication gaps for the pupil expansion. That is, neighboring beams of the output pupil 735-c may be directly adjacent to one another. In some cases, each end may be coated with an absorptive or reflective coating element as a means to at least mitigate stray light emission by duct structure 700-c.

One or more of planar region 710-c, planar region 725-c, surface 705-c, and the ends incorporated into each of duct structure 700-b may include a region or aperture for input pupil 730-c. The region or aperture may be uncoated or specially-coated to facilitate the input. Light of the input pupil 730-c may enter the aperture of duct structure 700-c. In some cases, the contained light modes of input pupil 730-c may be reflected by at least the implemented reflective coating elements of the parallel planar regions 710-c and 715-c incorporated within duct structure 700-c. The reflected light of input pupil 730-c may have a first angle of reflection within a total internal reflection (TIR) range with respect to an axis common to the propagation direction of duct structure 700-c. At least planar regions 710-c and 725-c may guide the reflected light of input pupil 730-c at a second angle of reflection with respect to a second, transverse axis to the propagation direction. The duct structures 700-c may then emit the reflected light modes as an output pupil 735-c for guided image projection. The incorporated reflective coatings of the planar regions 710-c and 725-c may sustain parallelism between the incident light of an input pupil 730-c and the reflected light output from duct structure 700-c. In the case of one or more partially reflective coatings elements, the configuration of the coating elements may provide uniform output pupil intensity (e.g., constant pupil brightness) of the reflected light modes in accordance with uniform, or varying, incidence angle, wavelength, and polarization.

As illustrated in FIG. 7C, duct structure 700-c may include parallel planar regions 710-c and planar region 725-c. Each of planar regions 710-c and 725-c may be coated with a fully reflective coating element. Planar regions 710-c and 725-c may sustain parallelism throughout duct structure 700-c and include a surface 705-c, perpendicular to both planar regions 710-c and 725-c as a means to sustain orthogonal corners within duct structure 700-c and preserve image fidelity. Surface 705-c may be coated with a partially reflective coating.

Similar to surface 705-b, described with reference to the aforementioned FIG. 7B, the partially reflective coating element disposed at surface 705-c may be substantially uniform. For example, at high reflectivity limits, light emitted by surface 705-c may remain undepleted. In some cases, the partially reflective coating element disposed at surface 705-c may be spatially-variable to increase output brightness while maintaining uniformity. Additionally or alternatively, the partially reflective coating element of surface 705-c may be angularly-variable to improve uniformity and/or implement pupil equalization. That is, the reflectivity may be spatially uniform with respect to an incident angle and/or wavelength of propagating light incident on the surface. In some cases, an azimuth-of-incidence selective surface (e.g., a film layer) may be disposed at surface 705-c as a means to reduce the propagation of wasted light through duct structure 700-c and promote pupil equalization at the output pupil 735-c.

A planar region denoted as a homogenizer 740 may be placed within duct structure 700-c offset to a planar region 710-c of the duct structure 700-c. Homogenizer 740 may sustain parallelism with planar regions 710-c and 725-c of the duct and maintain perpendicularity with surface 705-c. Homogenizer 740 may comprise a partially reflective coating element to homogenize the TIR modes of input pupil 730-c, thus improving lateral homogenization. For example, homogenizer 740 may sustain approximately 50 percent reflectivity and may be oriented at an offset of planar region 710-c (e.g., offset at ⅔ a width of duct structure 700-c) and extend a length of the duct structure 700-c parallel to the planar region 710-c. Homogenizer 740 may guide propagating light within the transverse dimension of duct structure 700-c in accordance with the partially reflective properties of the homogenizer 740, improving lateral homogenization of light reflected back toward planar region 710-c and light permitted through to planar region 725-c. In some embodiments, homogenizer 740 may implement one or more skew mirrors or alternate partially reflective surfaces. Similarly, the surfaces may be oriented to sustain parallelism with homogeneous planar regions 710-c and 725-c of duct structure 700-c. Additionally or alternatively, a homogenizer may be placed within a plinth (i.e. a base structure supporting the prism) abutted at the input aperture of duct structure 700-c or an alternative portion of the waveguide. The plinth, including the homogenizer, may be index matched such that light may pass from the plinth to duct structure 700-c.

Input light modes comprising input pupil 730-c may enter duct structure 700-c via an aperture of planar region 710-c. In alternate embodiments, the aperture may be located at an alternative planar region, surface, or end of duct structure 700-c. The input light may propagate into duct structure 700-c, and reflect at a first angle of reflection within a TIR range common to a first axis. In some cases, the first axis may be common to a propagation direction of duct structure 700-c. Planar regions 710-c and 725-c may guide the light modes of input pupil 730-c in a transverse (i.e. non-TIR) dimension of a second, alternative axis via the reflective coating elements disposed at planar regions 710-c and 725-c. The propagated light may be directed to the partially reflective coating element of surface 705-c. Light transmitting through the partially reflective element of surface 705-c may constitute an expanded output pupil 735-c for projection. Output pupil 735-c may be composed of one or more replications of input pupil 730-c, without gaps between the replications. The intensity of output pupil 735-c may be substantially uniform, with sustained image fidelity.

Figure 8A:
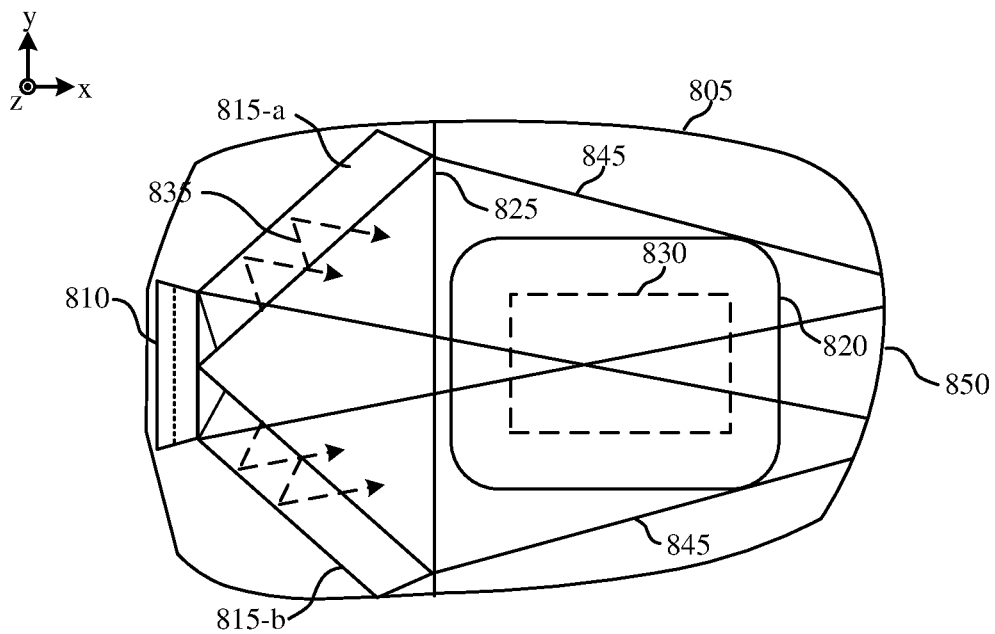
FIG. 8A illustrates an example of an optical lens that supports duct pupil expansion in accordance with various aspects of the present disclosure.

FIG. 8A illustrates an example of an optical lens 800-a that supports duct pupil expansion in accordance with various aspects of the present disclosure. The respective view (i.e., a front view or lens-facing view) may correspond to an x, y planar region associated with the enclosed orientation axis of optical lens 800-a. Optical lens 800-a may include a waveguide 805, a light input section 810, a pair of duct structures 815-a and 815-b, a second light coupling device 820 (e.g., an output coupler), an intercoupling joint 825, and an eye box 830. Optical lens 800-a may include additional light coupling devices (e.g., an input coupler); however, the additional features are ignored for the purpose of illustration.

Duct structures 815-a and 815-b may be arranged and disposed at relative angles (e.g., orthogonal with respect to a longitudinal dimension of the respective duct structure) to form a first light coupling device (i.e., a chevron cross coupler). The first light coupling device may be classified as a waveguide structure. Duct structures 815-a and 815-b may be uniform in size and dimension and oriented such that the output pupil emitted by the first light coupling device laterally homogeneous. In some cases, a light input section 810 may be positioned at an planar region of the first light coupling device, proximal to a light input aperture of the first light coupling device. In some cases, the planar region may include at least one or more ends of the arranged duct structures 815-a and 815-b. In other cases, the light input section 810 may be positioned on a corner of the first light coupling device or internal to the first light coupling device (i.e., inside the waveguide, proximal to second light coupling device 820 and distal to light input section 810) as a means to increase light efficiency at the projection. Duct structures 815-a and 815-b of the coupler may be capable of reflecting light in any polarization state and may remove the necessity for a birefringent or volume holographic element. The first light coupling device may be intercoupled within waveguide 805 at a joint 825. In some cases, the first light coupling device and waveguide 805 may be intercoupled using an overlapping joint architecture. In other cases, the heterogeneous waveguides may be intercoupled via butt-coupling of adjacent surfaces. An optical adhesive may be disposed at the first light coupling device (e.g., at a surface of duct structure 815-a, duct structure 815-b, or a combination thereof) or at the waveguide 805 to implement intercoupling.

The first light coupling device may receive one or more incident light beams (e.g., modes) comprising an input pupil via light input section 810. The first light coupling device may then reflect the incident light modes in one or more guided dimensions (e.g., TIR and non TIR) via one or more reflective and/or absorptive coating elements disposed within the comprised duct structures 815-a and 815-b of the first light coupling device. The reflected light may then be emitted by the first light coupling device as an output pupil of the image projection, and directed to second light coupling device 820. For example, light 835 corresponding to the highest vertical field angles of the input pupil may be reflected by one or more disposed coating elements of duct structure 815-a, to second light coupling device 820. The reflected light may span a spatial range 845, bathing a lower portion of second light coupling device 820. Similarly, light corresponding to the lowest vertical field angles may be reflected by one or more disposed coating elements of duct structure 815-b to second light coupling device 820. The reflected light of the lower angles may subsequently bathe an upper portion of second light coupling device 820. In addition, light corresponding to some intermediate vertical field angles may pass through a partially reflective coating element disposed at surfaces (e.g., bottom surface) of the duct structures 815-a and 815-b, to the waveguide 805, including second light coupling device 820. The emitted light of the output pupil may reach the distal planar region of second light coupling device 820, promoting lateral homogeneity within the image projection.

Figure 8B:
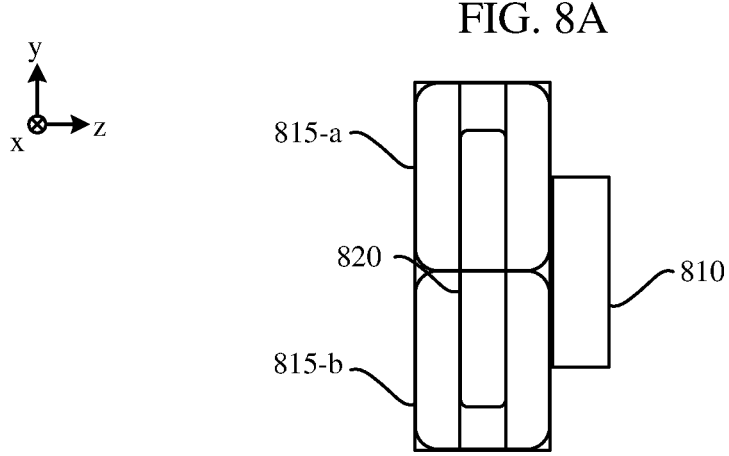
FIG. 8B illustrates an example of an optical lens that supports duct pupil expansion in accordance with various aspects of the present disclosure.

FIG. 8B illustrates an example of an optical lens 800-b that supports duct pupil expansion in accordance with various aspects of the present disclosure. Optical lens 800-b may an example of optical lens 800-a, described with reference to FIG. 8A. The respective view (i.e., a side view) may correspond to a y, z planar region associated with the enclosed orientation axis of optical lens 800-b.

Duct structures 815-a and 815-b may be arranged and disposed at relative angles to form a first light coupling device (i.e., a chevron cross coupler). In some cases, the ducts may be uniform in size and dimension, and oriented such that the expanded pupil of the projection is laterally homogeneous. In some cases, a light input section 810 may be positioned at an planar region of the first light coupling device, proximal to an input aperture of the first light coupling device. In some cases, the planar region may include at least one or more ends of the arranged duct structures 815-a and 815-b. In other cases, light input section 810 may be positioned on a corner of the first light coupling device. In addition, the first light coupling device may be intercoupled with a heterogeneous waveguide, including a second light coupling device 820, for performing laterally homogeneous, expanded pupil projection.

Figure 8C:
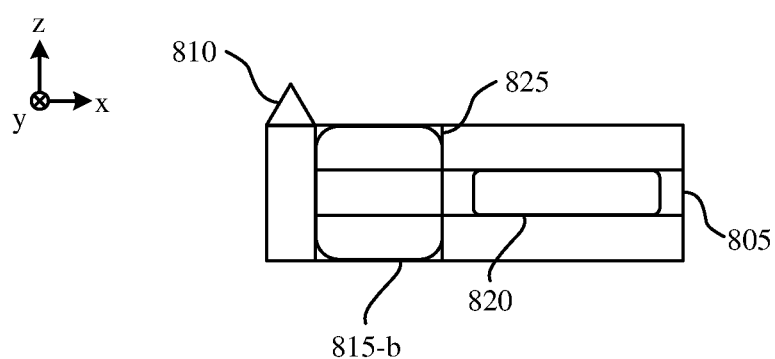
FIG. 8C illustrates an example of an optical lens that supports duct pupil expansion in accordance with various aspects of the present disclosure.

FIG. 8C illustrates an example of an optical lens 800-c that supports duct pupil expansion in accordance with various aspects of the present disclosure. The optical lens 800-c may be an example of optical lenses 800-a and 800-b, described with reference to FIGS. 8A and 8B. The respective view (i.e., a top or bottom view depending on a light input configuration) may correspond to an x, z planar region associated with the enclosed orientation axis of optical lens 800-c.

Duct structures 815-b may be arranged and disposed to form a portion of a first light coupling device (i.e., a chevron cross coupler). The first light coupling device may be classified as a waveguide of the optical lens 800-c. In some cases, a light input section 810 may be positioned at an planar region of the first light coupling device, proximal to an input aperture of the first light coupling device. In some cases, the planar region may include at least one or more ends of the arranged duct structures 815-a and 815-b. In other cases, the input aperture may be positioned on a corner of the first light coupling device. In addition, the first light coupling device may be intercoupled with waveguide 805 at joint 825. Waveguide 805 may include a second light coupling device 820 spatially offset from the joint of the intercoupled waveguides.

Figure 9A:
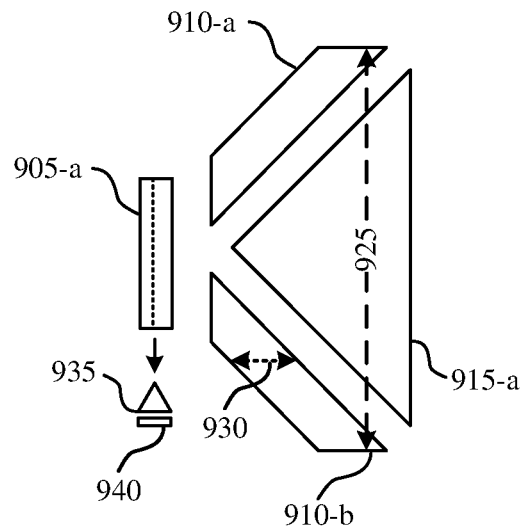
FIG. 9A illustrates an example of a fabrication of a light coupling device that supports duct pupil expansion in accordance with various aspects of the present disclosure.

FIG. 9A illustrates an example of a fabrication of a first light coupling device 900-a (e.g., a chevron coupler) that supports duct pupil expansion in accordance with various aspects of the present disclosure. In some configurations, first light coupling device 900-a may be implemented within an HMD device such as, but not limited to HMD device 100 of FIG. 1. In some configurations, first light coupling device 900-a may be implemented in conjunction with waveguides 365 and 370 with reference to FIG. 3. Additionally or alternatively, in some configurations, first light coupling device 900-a may be an example of, or implemented in conjunction with, aspects of optical lens 800-a through 800-c, described with reference to FIGS. 8A through 8C.

Components of first light coupling device 900-a may comprise multiple glass elements or substrates, including at least a pair of duct structures 910-a and 910-b, and a substrate material fill (e.g., chevron fill 915-a). The glass elements of duct structures 910-a and 910-b may be thin (e.g., 1.5 mm) and configured to direct reflected light through first light coupling device 900-a. A first set of elements within duct structures 910-a and 910-b may be oriented to support parallelism between the one or more elements of the first set of elements. A second, alternative set of elements may be oriented and adjoined to the first set of elements. In some cases, the second set of elements may be oriented to sustain perpendicularity between the first set of elements and the second set of elements, throughout duct structures 910-a and 910-b. Additionally, the orientation of the second set of elements may sustain parallelism between the one or more elements of the second set of elements. In some cases, at least a portion of the glass surfaces may be polished or coated, either individually or as a group.

Duct structures 910-a and 910-b may sustain a uniform duct structure width 930, and may be spatially offset by a height 925. In some cases, the height 925 may correspond to a lateral distance of the chevron fill 915-a according to a reference axis. For example, height 925 may correspond to a lateral distance of chevron fill 915-a. A coupling prism 935 and prism plinth 940 may be implemented within a light input section 905-a. Additionally or alternatively, light input section 905-a may include a beveled planar region, a diffractive element, or the like for an input coupling operation. In some cases, light input section 905-a may be abutted to at least one of duct structures 910-a and 910-b, via the prism plinth 940. For example, a 1.5 mm waveguide may orient duct structures 910-a and 910-b to comprise first light coupling device 900-a, and implement a 40 degree diagonal field of view (e.g., 35.2 degrees horizontal by 20.2 degrees vertical). Both duct structures 910-a and 910-b may have a duct width of 6.0 mm and a height of 25.5 mm. First light coupling device 900-a may have a thickness of 1.5 mm and an input aperture of height 12.0 mm. A prism of size 7.0 mm may be abutted to both of the duct structures 910 via prism plinth 940, which may include a light input section 905-a. First light coupling device 900-a may receive an input pupil from light input section 905-a and propagate the incident light into the input aperture and through each the duct structures 910-a and 910-b.

In some cases, light modes corresponding to the highest vertical field angles of the input pupil may be reflected by one or more disposed coating elements of duct structure 910-a. The reflected light may span a spatial range corresponding to the dimensionality of duct structure 910-a, providing a directed portion of an emitted output pupil. Similarly, light corresponding to the lowest vertical field angles may be reflected by one or more disposed coating elements of duct structure 910-b. The reflected light may span a spatial range corresponding to the dimensionality of duct structure 910-*b*, providing a directed portion of the emitted output pupil. By using the 7.0 mm coupling prism, first light coupling device 900-*a* may be capable of fully homogenizing at least the higher required TIR mode angle of approximately 64.4 degrees. The width of duct structures 910-*a* and 910-*b* may allow for proper homogenization of the TIR mode, and produce a pupil replication period of approximately 6.25 mm.

Figure 9B:
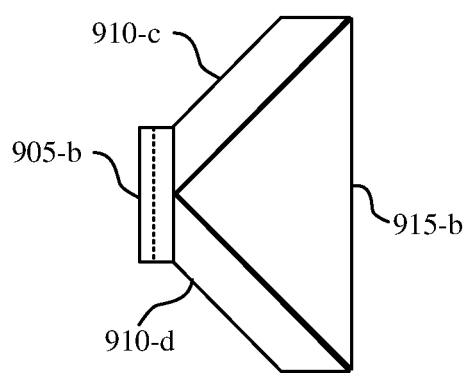
FIG. 9B illustrates an example of a fabrication of a light coupling device that supports duct pupil expansion as described with reference to FIG. 9A.

FIG. 9B illustrates an example of a fabrication of a first light coupling device 900-*b* (e.g., a chevron coupler) that supports duct pupil expansion in accordance with various aspects of the present disclosure. First light coupling device 900-*b* may represent an embodied implementation of the components comprising first light coupling device 900-*a* as described with reference to FIG. 9A.

In some cases, a surface or planar region of duct structures 910-*c* and 910-*d* may be adhered to a surface of chevron fill 915-*b* via an optically clear adhesive. The adhesive may index-match the glass surfaces of the duct structures 910-*c* and 910-*d* and chevron fill 915-*b*. Light input section 905-*b* may be abutted to first light coupling device 900-*b*. In some cases, light input section 905-*b* may comprise a prism and prism plinth, where the plinth may be adhered to a portion of the duct structures 910-*c* and 910-*d* and may include at least an input aperture. In other cases, a beveled planar region, a diffractive element, or the like may be implemented for intercoupling light input section 905-*b* with at least duct structures 910-*c* and 910-*d*. An input aperture may be located at a surface, planar region, or end of duct structures 910-*c* and 910-*d*.

Figure 10A:
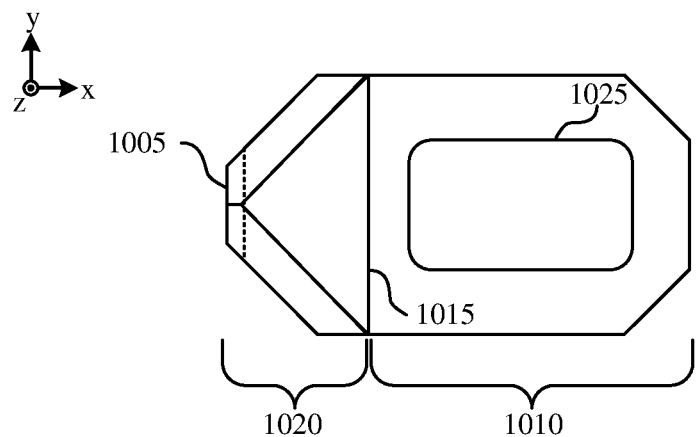
FIG. 10A illustrates an example of an optical lens that supports duct pupil expansion in accordance with various aspects of the present disclosure.

FIG. 10A illustrates an example of an optical lens 1000-*a* that supports duct pupil expansion in accordance with various aspects of the present disclosure. The respective view (i.e., a front view or lens-facing view) may correspond to an x, y planar region associated with the enclosed orientation axis of optical lens 1000-*a*. Optical lens 1000-*a* may comprise at least a first light coupling device 1020 and a waveguide 1010 that may include a second light coupling device 1025. Optical lens 1000-*a* may also include an additional light coupling device (e.g., an input coupler); however, the input coupler is ignored for the purpose of illustration.

In some embodiments, the first light coupling device 1020 may be intercoupled with waveguide 1010. In some cases, first light coupling device 1020 and waveguide 1010 may be intercoupled using a joint architecture, with first light coupling device 1020 and waveguide 1010 may be butt coupled at a joint 1015 to share a common planar region. In other cases, first light coupling device 1020 and waveguide 1010 may be intercoupled via an alternate coupling orientation, such as an overlapping joint architecture, or the like. Intercoupling between first light coupling device 1020 and waveguide 1010 may be implemented via an optical adhesion at adjacent substrates.

First light coupling device 1020 may contain one or more duct structures, as well as a light input section 1005, abutted to an input aperture of first light coupling device 1020. As illustrated, the one or more duct structures of first light coupling device 1020 may be symmetric with regard to length, width, and orientation of the contained components of the duct structures. Each of the duct structures may be relatively offset from one another by an orientation angle associated with first light coupling device 1020. In some cases, the orientation angle may correspond to an orthogonal offset between the duct structures. Alternatively, in some cases, first light coupling device 1020 the one or more duct structures of first light coupling device 1020 may vary in uniformity or symmetry with regard to an orientation angle, a length, or a width. In some cases, light input section 1005 may be coupled to at least a surface, planar region, or end of the at least one substrate comprising first light coupling device 1020.

Waveguide 1010 may include a second light coupling device 1025. In some cases, second light coupling device 1025 may be a volume holographic light coupling element and may employ one or more skew mirror type components or devices. Utilizing skew mirror technology in second light coupling device 1025 may improve viewing capability and optical clarity of the optical lens 1000-*a*. Second light coupling device 1025 may also exhibit achromatic characteristics and provide a more expansive FOV while obviating impedances to optical clarity. In some cases, second light coupling device 1025 may be Bragg-mismatched to one reflection of TIR mode light emitted from the intercoupled first light coupling device 1020 (i.e., an output pupil of first light coupling device 1020). Based at least in part on the implemented skew mirror type components or devices, second light coupling device 1025 may further achieve an external FOV subject to a higher proportionality of the TIR angle range at light modes directed to second light coupling device 1025 (i.e., employ pupil expansion techniques). For example, at a bulk index of refraction of 1.5, an external FOV of second light coupling device 1025 may be approximately 1.5 times the TIR angle range of the one or more light modes of the output pupil emitted by first light coupling device 1020 and coupled at second light coupling device 1025.

Figure 10B:
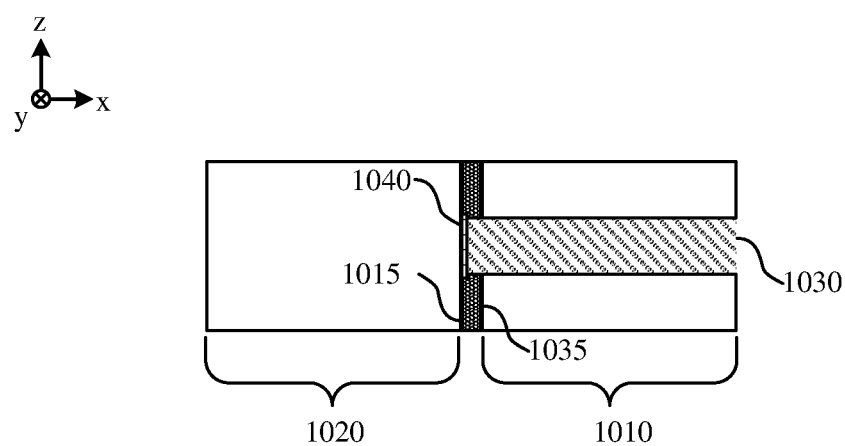
FIG. 10B illustrates an example of an optical system that supports duct pupil expansion in accordance with various aspects of the present disclosure.

FIG. 10B illustrates an example of an optical lens 1000-*b* that supports duct pupil expansion in accordance with various aspects of the present disclosure. Optical lens 1000-*b* may represent an embodied implementation of optical lens 1000-*a*, described with reference to FIG. 10A. The respective view (i.e., a top or bottom view depending on a light input configuration) of optical lens 1000-*b* may correspond to an x, z planar region associated with the enclosed orientation axis of optical lens 1000-*b*.

First light coupling device 1020 may contain one or more duct structures, as well as a light input section abutted to an input aperture of first light coupling device 1020. As illustrated, the one or more duct structures of first light coupling device 1020 may be symmetric with regard to length, width, and orientation of the contained components of the duct structures. Each of the duct structures may be relatively offset from one another by an orientation angle associated with first light coupling device 1020. In some cases, the orientation angle may correspond to an orthogonal offset between the duct structures. Alternatively, in some cases, first light coupling device 1020 the one or more duct structures of first light coupling device 1020 may vary in uniformity or symmetry with regard to an orientation angle, a length, or a width. First light coupling device 1020 may be intercoupled with waveguide 1010 using an optical adhesion, at a common planar region (i.e. joint) 1015. Waveguide 1010 may include a second light coupling device disposed within one or more substrates of waveguide 1010, including a waveguide medium 1030. Waveguide medium 1030 may extend through waveguide 1010, including the area corresponding to an optical adhesion 1035. Waveguide medium 1030 may include an abutted media layer block 1040 proximal to the first light coupling device 1020. Media layer block 1040 may be implemented to prevent deviated light rays from passing through the main media planar region and as a result, may perform intercoupled waveguide modulation.

Figure 11A:
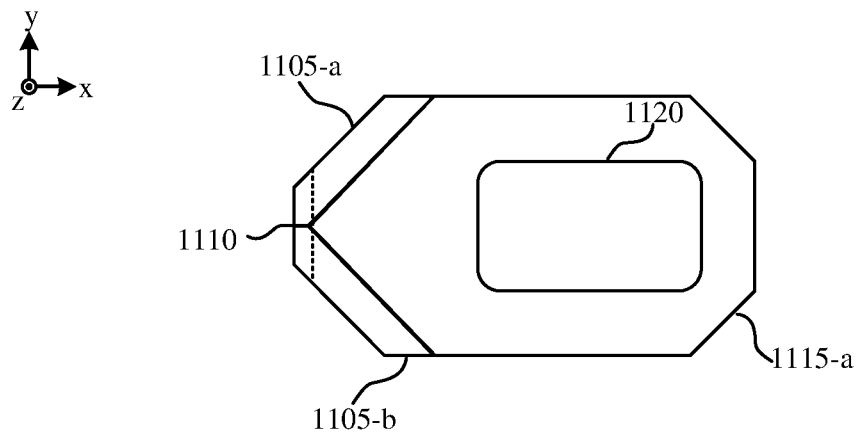
FIG. 11A illustrates an example of an optical lens that supports duct pupil expansion in accordance with various aspects of the present disclosure.

FIG. 11A illustrates an example of an optical lens 1100-*a* that supports duct pupil expansion in accordance with various aspects of the present disclosure. The respective view (i.e., a front view or lens-facing view) may correspond to an x, y planar region associated with the enclosed orientation axis of optical lens 1100-*a*. Optical lens 1100-*a* may comprise at least a pair of duct structures 1105-*a* and 1105-*b* and a waveguide 1115-*a* that includes a second light coupling device 1120. Optical lens 1100-*a* may also include an additional light coupling device (e.g., an input coupler); however, the input coupler is ignored for the purpose of illustration.

In some embodiments, duct structure 1105-*a* and duct structure 1105-*b* may be directly intercoupled with waveguide 1115-*a* via an optical adhesive. Duct structure 1105-*a* and duct structure 1105-*b*, as well as waveguide 1115-*a*, may represent a set of coupled waveguides (e.g., the duct structures 1105-*a* and 1105-*b* comprising a chevron coupler and therefore a waveguide). Each of the intercoupled waveguides (e.g., the comprised chevron coupler and waveguide 1115-*a*) may include one or more absorptive or reflective coating elements at component portions of the waveguides. For example, one or more planar regions and/or surfaces of duct structures 1105-*a* and 1105-*b* may include reflective coating elements for guiding one or more reflected light beams (e.g., modes) to second light coupling device 1120 of waveguide 1115-*a*. In the case of one or more partially reflective coating elements, the configuration of the coating elements may provide uniform output pupil intensity (e.g., constant pupil brightness) of the modes within the duct structures 1105-*a* and 1105-*b*, in accordance with uniform or varying incidence angle, wavelength, and polarization.

As illustrated, duct structures 1105-*a* and 1105-*b* may be symmetric with regard to length, width, and orientation of the contained components within duct structures 1105-*a* and 1105-*b*. Duct structures 1105-*a* and 1105-*b* may be relatively offset from one another by an orientation angle. Alternatively, in some cases, duct structures 1105-*a* and 1105-*b* may vary in uniformity or symmetry with regard to an orientation angle, a length, or a width. In some cases, light input section 1110 may be coupled to at least a surface, planar region, or end of the at least one substrates comprising the duct structures 1105-*a* and 1105-*b*. In some cases, one or more component elements of the substrates comprising duct structure 1105-*a* or duct structure 1105-*b* may be segmented for achieving granular selectivity of reflected modes within the respective duct structures 1105-*a* and 1105-*b*. For example, surfaces of the substrate comprising at least one of duct structures 1105-*a* and 1105-*b* may be separated into one or more sub-surfaces. Additional step sub-surfaces may be integrated between the separated sub-surfaces. One or more reflective coating elements may be disposed within each of the separated sub-surfaces of the at least one duct structures 1105-*a* and 1105-*b*. In some cases, each step sub-surface may be untreated with a reflective coating element. Alternatively, each step sub-surface may be disposed with a reflective coating element or an absorptive substance.

Waveguide 1115-*a* may include a second light coupling device 1120. In some cases, second light coupling device 1120 may be a volume holographic light coupling element and may include one or more skew mirror type components or devices. Utilizing skew mirror technology in second light coupling device 1120 may improve viewing capability and optical clarity of the optical lens 1100-*a*. Second light coupling device 1120 may also exhibit achromatic characteristics and provide a more expansive FOV while obviating impedances to optical clarity. In some cases, second light coupling device 1120 may be Bragg-mismatched to one reflection of TIR mode light emitted from the intercoupled duct structures 1105-*a* and 1105-*b*. Based at least in part on the implemented skew mirror type components or devices, second light coupling device 1120 may further achieve an external FOV subject to a higher proportionality of the TIR angle range at light modes directed to second light coupling device 1120 (i.e., employ pupil expansion techniques). For example, at a bulk index of refraction of 1.5, an external FOV of second light coupling device 1120 may be approximately 1.5 times the TIR angle range of the one or more light modes of the output pupil emitted by duct structures 1105-*a* and 1105-*b*, and coupled at second light coupling device 1025.

Figure 11B:
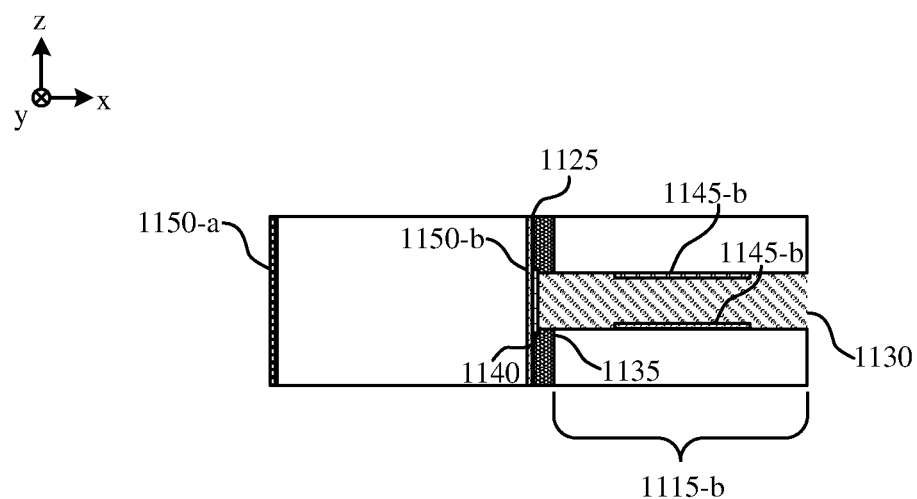
FIG. 11B illustrates an example of an optical system that supports duct pupil expansion in accordance with various aspects of the present disclosure.

FIG. 11B illustrates an example of an optical system 1100-*b* that supports duct pupil expansion in accordance with various aspects of the present disclosure. Optical system 1100-*b* may represent an embodied implementation of optical lens 1100-*a*, described with reference to FIG. 11A. The respective view (i.e., a top or bottom view depending on a light input configuration) may correspond to an x, z planar region associated with the enclosed orientation axis of optical system 1100-*b*.

Each of the duct structures 1105-*a* and 1105-*b*, described with reference to FIG. 11A, may be directly adhered to waveguide 1115-*b* via an optical adhesion 1135. The adhesion may be disposed at one or more substrates of optical system 1100-*b* corresponding to a common joint 1125 of the intercoupled optical system 1100-*b*. Optical system 1100-*b* may include one or more reflective elements 1150. Reflective element 1150-*a* may correspond to an end of the duct structures 1105, with reference to FIG. 11A, and may be co-located with a light input section 1110, with reference to FIG. 11A. Reflective element 1150-*b* may be associated with a media layer 1140 proximal to joint 1125. Each of the reflective elements 1150 may recirculate blocked light and allow greater pupil output efficiency. That is, greater pupil output efficiency may increase in output pupil intensity via the recirculation of blocked light within optical system 1100-*b*. Media layer 1140 may be fully reflective and implemented to prevent deviated light rays from passing through the main media layer 1140 planar region. Waveguide 1115-*b* may include a waveguide medium 1130. Waveguide medium 1130 may extend through waveguide 1115-*b* and the area corresponding to the optical adhesion 1135. In some cases, waveguide medium 1130 may include one or more homogenizing elements.

Figure 12:
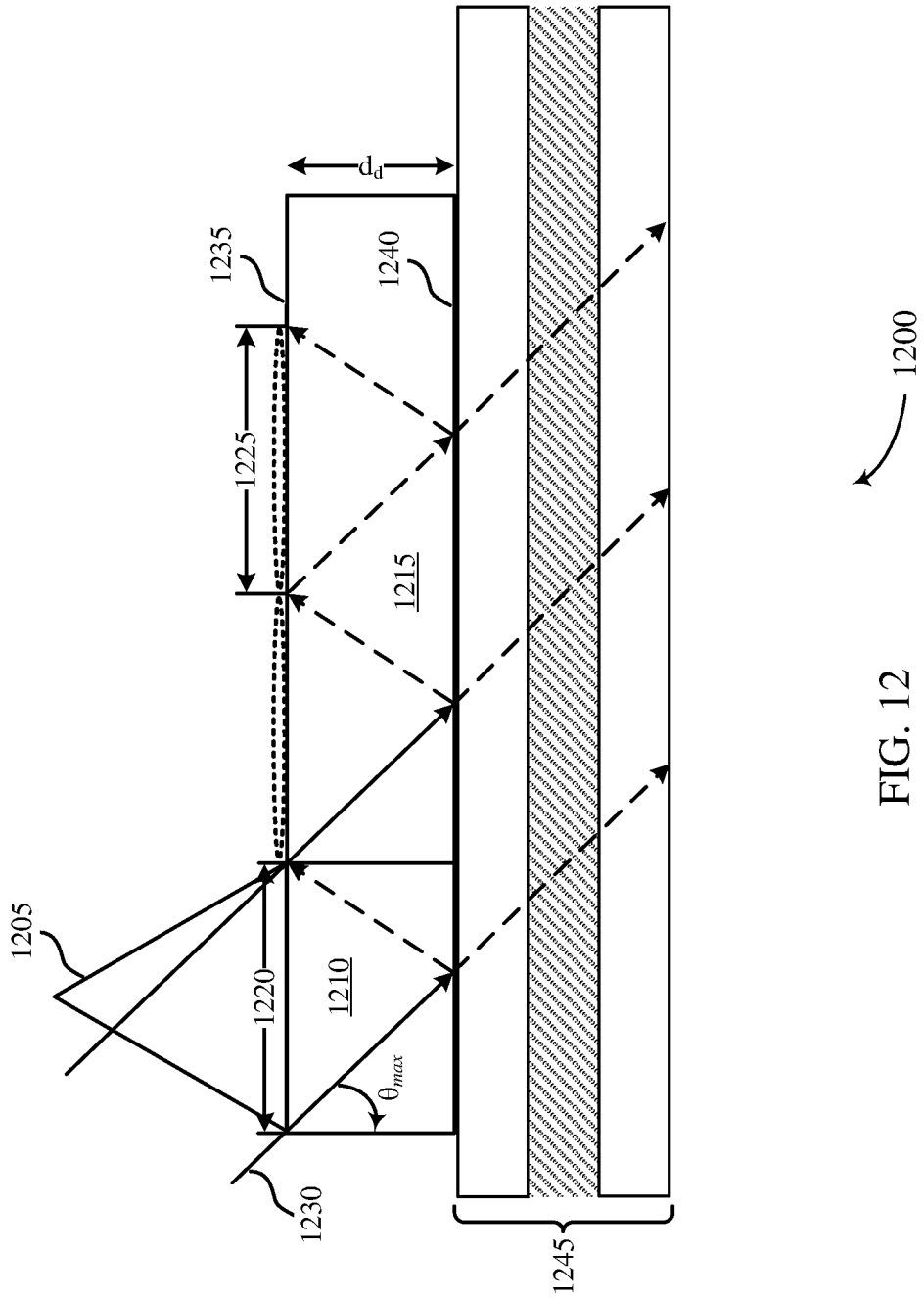
FIG. 12 illustrates an example of an optical system that supports duct pupil expansion in accordance with various aspects of the present disclosure.

FIG. 12 illustrates an example of an optical system 1200 that supports duct pupil expansion in accordance with various aspects of the present disclosure. Optical system 1200 embodies principles of light input coupling and TIR mode homogenization within a duct structure 1215. Additionally, optical system 1200 may include a light input section comprising at least a prism 1205 and prism plinth 1210. Prism plinth 1210 may be abutted to an end of duct structure 1215 as a means for intercoupling. Similarly, in alternative embodiments, prism plinth 1210 may be abutted to a surface or planar region of the substrate comprising waveguide 1245.

Light may be incident at prism 1205 and coupled to duct structure 1215 via prism plinth 1210. The light of the input pupil may be collimated into one or more non-divergent light beams (e.g., mode(s) 1230). Mode 1230 may correspond to a display pixel of the out-coupled image projection of duct structure 1215. Mode 1230 may propagate through prism plinth 1210 and subsequently duct structure 1215, promoting a reflected, collimated output mode spanning a lateral area (e.g., replicated pupil area 1225) throughout duct structure 1215. The output pupil of the reflected output modes may be composed of one or more replicated pupil copies of the input pupil incident at prism 1205.

Each mode 1230 may be characterized as fully homogenized when the one or more replicated pupil areas 1225 are substantially equivalent to the in-coupled pupil area 1220 and adjacent throughout the intercoupled prism plinth 1210 and duct structure 1215. Thus, homogenization may correspond to an absence of overlap or gaps between each of the one or more replicated pupil areas 1225. The largest input pupil in-coupled at prism 1205 may correspond to lateral prism length p. In some cases, prism length p may be equivalent to the in-coupled pupil area 1220. A large mode angle may aid in the ability of optical system 1200 to achieve a large FOV in the wave-guided dimension, at the discretion of the prism length p and the thickness $d_d$ of duct structure 1215. In the case of full homogenization, $\theta_{max}$ may be defined in terms of the prism length p and thickness $d_d$ of duct structure 1215 via the trigonometric equation $$\theta_{max} = \tan^{-1}\left(\frac{p}{2d_d}\right).$$

For example, for a heterogeneous waveguide 1245, of thickness 1.5 mm, intercoupled with a common waveguide system comprising at least prism plinth 1210, duct structure 1215, and prism 1205 may achieve full-homogenization of reflected modes 1230 within each replicated pupil copy 1225, subject to a mode angle range. Specifically a common prism plinth 1210 and duct structure 1215, of thickness $d_d$=1.5 mm, and a 12 mm prism 1205, may achieve an external FOV of 53.4 degrees in the wave-guided dimension. Each mode 1230 contained within the emitted output pupil, spanning the achieved external FOV, may be fully homogenized up to a maximum mode angle $\theta_{max}$ of approximately 76 degrees.

In some cases, a reflective coating on a surface, planar region, or end of prism plinth 1210, duct structure 1215, or both, may aid in isolating bright, undepleted light within duct structure 1215 and alternative light of the waveguide 1245. Additionally, it may be beneficial to reduce the thickness $d_d$ of prism plinth 1210, duct structure 1215, or both, prior to intercoupling prism plinth 1210 and duct structure 1215 with waveguide 1245. The reduced thickness may allow for a smaller prism 1205 and compact external projection optics while achieving a substantially equivalent maximum mode angle $\theta_{max}$ for full homogenization. In some cases, the aforementioned embodiment may reduce the in-coupled pupil of the optical system 1200 and lessen the required working distance for propagation of a mode 1230, permitting further compactness of external projection optics. For example, a prism plinth 1210 and duct structure 1215 of thickness $d_d$=0.5 mm, may be adhered to a waveguide 1245 of thickness 1.5 mm, and may allow the same maximum mode angle $\theta_{max}$ of 76 degrees via in-coupling at a 4 mm prism 1205.

Figure 13:
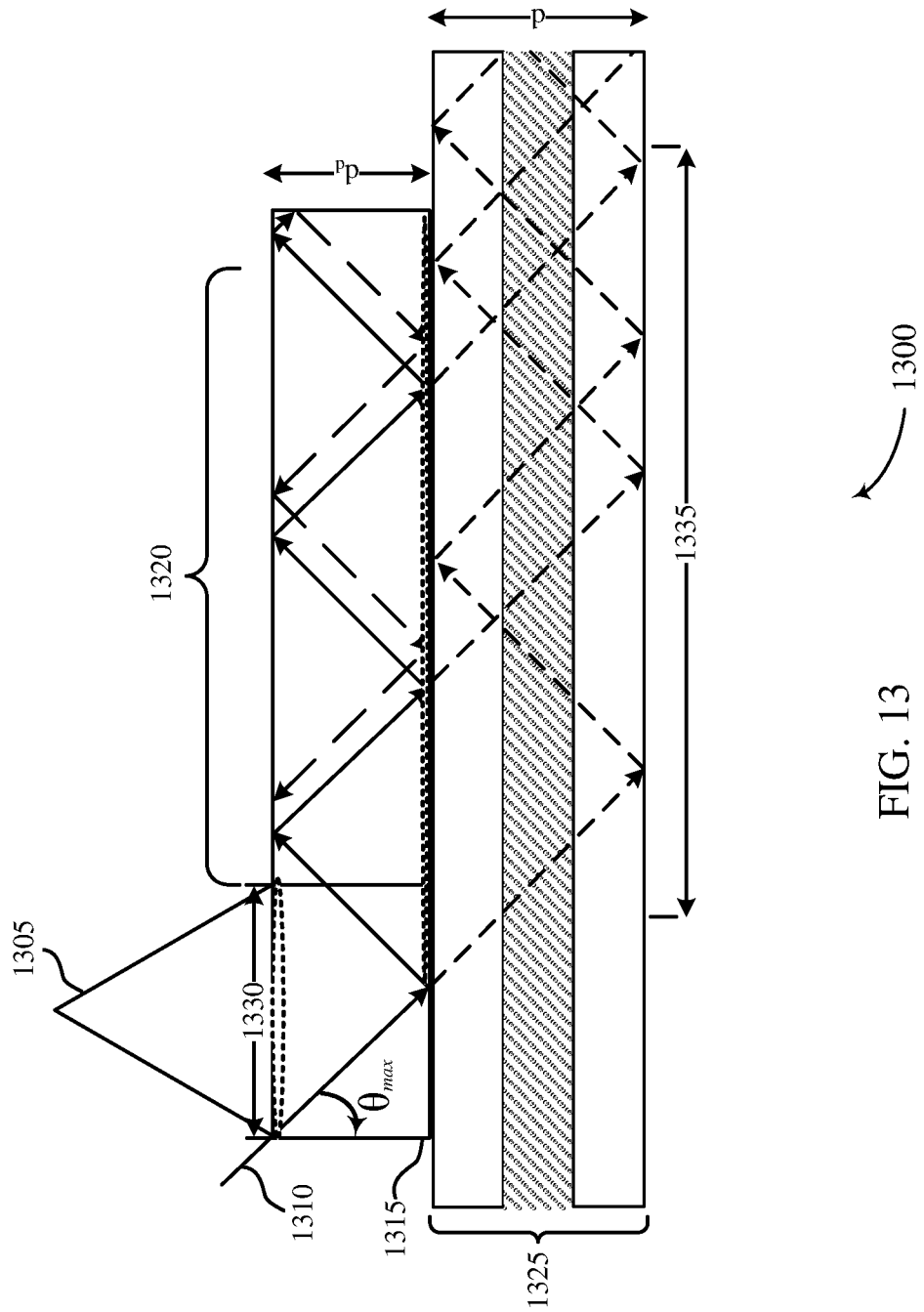
FIG. 13 illustrates an example of an optical system that supports duct pupil expansion in accordance with various aspects of the present disclosure.

FIG. 13 illustrates an example of an optical system 1300 that supports duct pupil expansion in accordance with various aspects of the present disclosure. In some configurations, optical system 1300 may be an example of embodiments of, or implemented in conjunction with, optical system 1200 as described with reference to FIG. 12.

A first light coupling device corresponding to a duct structure 1320 and a light input section comprising a prism plinth 1315 and a prism 1305. Prism plinth 1315 and prism 1305 may be intercoupled with a waveguide 1325. In some cases, duct structure 1320 and prism plinth 1315 may be surface adhered (i.e. surface intercoupled) to a waveguide 1325 at a bottom surface of duct structure 1320 and prism plinth 1315. The bottom surface of duct structure 1320 or prism plinth 1315 may be coated with a reflective coating element. In some cases, the coating may be highly reflective, and the coupling structure may be regarded as an undepleted waveguide structure, uniformly emitting collimated light into waveguide 1325.

One or more light beams (e.g., modes) 1310 of an in-coupled pupil area 1330 may be in-coupled via prism 1305 and directed through prism plinth 1315 and coupled duct structure 1320. Modes 1310 may be collimated and propagated through the first light coupling device with uniform emission into waveguide 1325. Each collimated mode 1310 may correspond to a display pixel of the image projection. The properties of the first light coupling device fabrication, including adhesion to waveguide 1325 and the reflectivity of the floor coating elements at duct structure 1320 and/or prism plinth 1315, may allow for a larger replicated pupil copy spanning an area 1335 at waveguide 1325. Area 1335 of the replicated pupil copy may correspond to a length W associated with the ray path of the one or more in-coupled light modes 1310 through duct structure 1320. Thus, the coupling structure may serve as a pupil expander, increasing the replicated pupil copy of the optical system 1300. The replicated pupil copy may be fully homogenized throughout the optical system 1300, up to a maximum mode angle $\theta_{max}$ defined by the trigonometric equation $$\theta_{max} = \tan^{-1}\left(\frac{W}{2d}\right).$$

Figure 14:
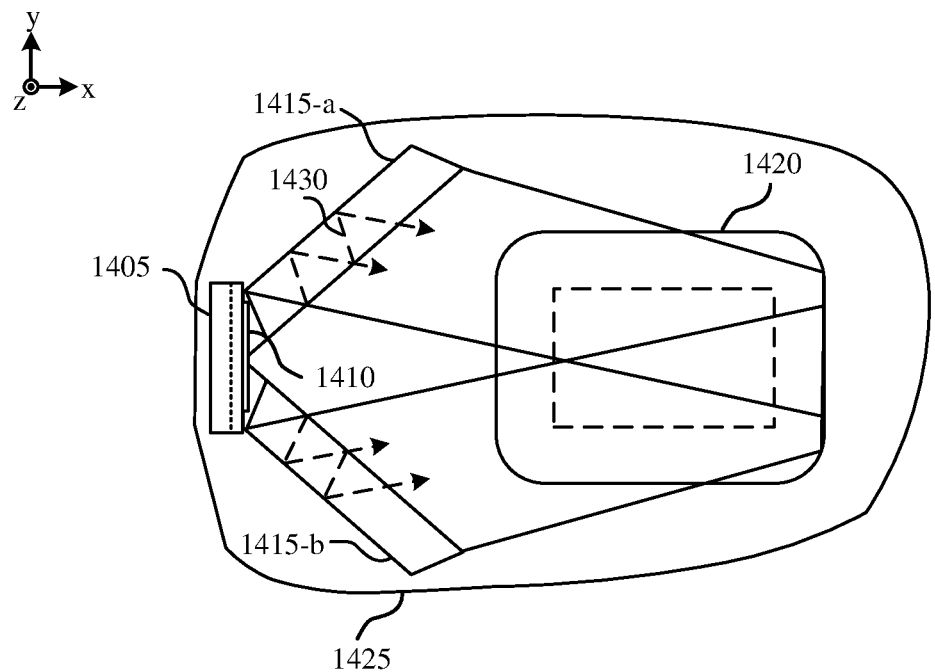
FIG. 14 illustrates an example of an optical lens that supports duct pupil expansion in accordance with various aspects of the present disclosure.

FIG. 14 illustrates an example of an optical lens 1400 that supports duct pupil expansion in accordance with various aspects of the present disclosure. The respective view (i.e., a front view or lens-facing view) may correspond to an x, y planar region associated with the enclosed orientation axis of optical lens 1400. Optical lens 1400 may include at least a light input section 1405, one or more duct structures 1415-*a* and 1415-*b*, and a waveguide 1425 containing a second light coupling device 1420 (e.g., an output coupler). Waveguide 1425 may include additional light coupling devices (e.g., an input coupler); however, the additional features are ignored for the purpose of illustration.

The one or more duct structures 1415-*a* and 1415-*b* may be arranged and disposed at relative angles (e.g., orthogonal) to form a first light coupling device (i.e., a chevron cross coupler). The first light coupling device may be classified as a waveguide structure. The one or more duct structures 1415-*a* and 1415-*b* may be uniform in size and dimension, and oriented such that the output pupil emitted by the first light coupling device is laterally homogeneous. In some cases, light input section 1405 may be positioned at an planar region of the first light coupling device, where the planar region consists of at least one or more ends of the duct structures 1415-*a* and 1415-*b*. In other cases, the input aperture 1410 may be positioned on a corner of the first light coupling device or internal to the first light coupling device (i.e., inside the waveguide, proximal to second light coupling device 1420 and distal to one or more ends of the duct structures 1415-a and 1415-b) as a means to increase light efficiency at the projection. Each of the one or more duct structures 1415-a and 1415-b may be surface adhered to waveguide 1425 via a bottom surface of the substrates comprising the duct structure 141-a and 1415-b 5. One or more planar regions of the duct structures 1415-a and 1415-b may be coated with a fully reflective coating, and at least the bottom surface may be coated with a partially reflective coating (e.g., a spatially and/or angularly varying reflective coating or a spatially and/or angularly uniform reflective coating).

In some cases, one or more polarization elements may be disposed at the one or more surfaces of the first light coupling element (e.g., at the duct structures 1415-a and 1415-b of the first light coupling element), including surfaces contained within the one or more waveguides 1425. The one or more polarizing elements may variate the polarization state of the modes 1430 reflecting off of inner surfaces of the one or more substrates comprising the first light coupling element. In addition, the one or more polarizing elements may variate the polarization state of alternative light modes reflecting off of outer surfaces of the first light coupling device. For example, the one or more polarizing layers may be disposed at the joint region associated with the intercoupling of the first light coupling device and the waveguide 1425 (e.g., the adhered surfaces of the one or more duct structures 1415-a and 1415-b). The one or more polarization elements may reflect the one or more modes 1430 characterized to be substantially in a 'p' polarization state. Additionally, the one or more polarization elements may permit the one or more modes 1430 characterized to be substantially in a 's' polarization state. In some cases, intercoupled waveguide modulation may be disposed at the joint region associated with the intercoupling of the first light coupling device and the waveguide 1425. The intercoupled waveguide modulation may include one or more of amplitude, phase, or polarization modulation as a means to improve output intensity and uniformity of the one or more modes 1430, and may include an absorptive optical element, reflective optical element, birefringent optical element, or the like.

One or more input light modes 1430 of an input pupil may enter light input section 1405 and may be in-coupled to the one or more duct structures 1415-a and 1415-b of the first light coupling device via the input aperture 1410. At each duct structures 1415-a and 1415-b, incident light beams (e.g., modes 1430) may be reflected by at least the implemented fully reflective coating elements of the parallel planar regions incorporated within each of the duct structures 1415-a and 1415-b. The one or more modes 1430 may have a first angle of reflection within a TIR range with respect to an axis common to the propagation direction of the respective duct structures 1415-a and 1415-b. The parallel planar regions of duct structures 1415-a and 1415-b may guide the modes 1430 with respect a second angle of reflection corresponding to a second, transverse direction of the propagation direction of the respective duct structures 1415-a and 1415-b. Each of the duct structures 1415-a and 1415-b may then emit the reflected modes 1430 as an output pupil for guided image projection. The incorporated fully reflective coatings of the included planar regions within each of the duct structures 1415-a and 1415-b may sustain parallelism between the incident modes 1430 of an input pupil and the reflected light contained within the output pupil. The output pupil emitted by the first light coupling device may be directed to a second light coupling device 1420 of the waveguide 1425.

In some cases, light modes corresponding to the highest vertical field angles of the input pupil may be reflected by one or more disposed coating elements of duct structure 1415-a. The reflected light may span a spatial range corresponding to the dimensionality of duct structure 1415-a providing a directed portion of an emitted output pupil. Similarly, light corresponding to the lowest vertical field angles may be reflected by one or more disposed coating elements of duct structure 1415-b. The reflected light may span a spatial range corresponding to the dimensionality of duct structure 1415-b, providing a directed portion of the emitted output pupil. In addition, light corresponding to some intermediate vertical field angles may pass through a partially reflective coating element disposed at surfaces (e.g., bottom surface) of duct structures 1415-a and 1415-b and to second light coupling device 1420 of the intercoupled waveguide 1425. The emitted light of the output pupil may reach the distal planar region of second light coupling device 1420 promoting lateral homogeneity within the image projection. The first light coupling device may sustain properties of pupil expansion via at least the one or more reflective coating elements disposed within each of the respective duct structures 1415-a and 1415-b. For mode angles exceeding an angular threshold (e.g., 45 degrees) within at least one of the duct structures 1415-a and 1415-b, full lateral homogenization may be achieved for the output pupil directed to the adhered waveguide 1425 which includes the second light coupling device 1420. Each mode 1430 may be characterized as fully homogenized when the one or more pupil areas contained within the output pupil is substantially equivalent to the in-coupled pupil area at the light input section 1405. Thus, homogenization may correspond to an absence of overlap or gaps between each of the one or more replicated pupil areas within the output pupil.

Figure 15:
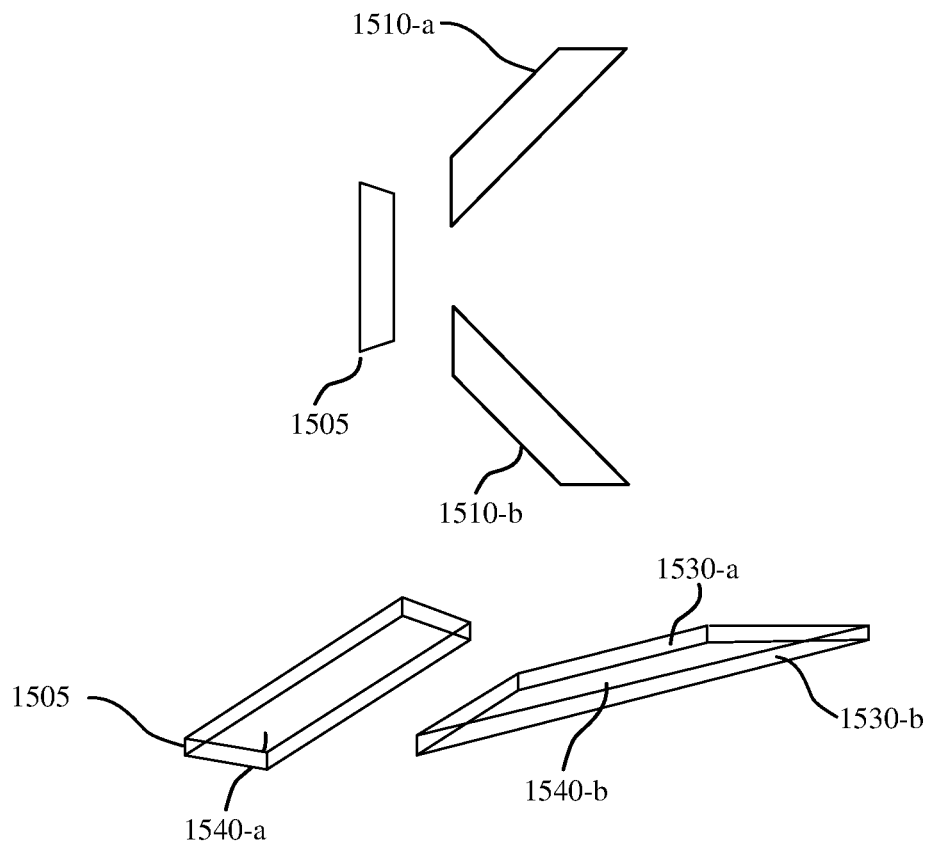
FIG. 15 illustrates an example of a fabrication of a light coupling device that supports duct pupil expansion in accordance with the present disclosure.

FIG. 15 illustrates an example of a fabrication of a first light coupling device 1500 (e.g., a chevron coupler) that supports duct pupil expansion in accordance with various aspects of the present disclosure. In some configurations, first light coupling device may be implemented in conjunction with waveguides 365 and 370 with reference to FIG. 3. Additionally or alternatively, in some configurations, first light coupling device 1500 may be an example of, or implemented in conjunction with, aspects of optical lens 1400, described with reference to FIG. 14.

Components of first light coupling device 1500 may comprise multiple glass elements or substrates, including at least a pair of duct structures 1510-a and 1510-b and a prism plinth 1505. In some cases, the prism plinth 1505 may be integrated as part of a light input section of the first light coupling device 1500. The glass elements may be thin (e.g., 1.5 mm) and configured to direct reflected light through each of the duct structures 1510-a and 1510-b. A set of planar regions 1530, within each of duct structures 1510-a and 1510-b, may be oriented to support parallelism between the one or more planar regions 1530-a and 1530-b of the first set of planar regions 1530. A set of surfaces 1540-a and 1540-b may be oriented and adjoined to each of planar regions 1530-a and 1530-b. In some cases, at least surface 1540-b may be oriented to sustain perpendicularity between the planar regions 1530-a and 1530-b and at least surface 1540-b throughout duct structures 1510-a and 1510-b. Each of the duct structures 1510-a and 1510-b may contain alternate portions of the substrate that sustain a planar orientation to an intersection of the one or more planar regions 1530-*a* and 1530-*b* and the one or more surfaces 1540-*b* of the duct structures 1510-*a* and 1510-*b*. The alternate portions may be denoted as ends.

Duct structures 1510-*a* and 1510-*b* may be uniform or vary in size and dimension, and oriented such that the reflected light beams (e.g., modes) within the emitted output pupil of first light coupling device 1500 is laterally homogeneous. As described herein, a light input section may be positioned at an planar region of first light coupling device 1500, proximal to an input aperture of first light coupling device 1500. The light input section may include at least a prism plinth 1505, and the planar region of the first light coupling device 1500 may consist of at least one or more ends of the arranged duct structures 1510-*a* and 1510-*b*. In some cases, an end of each of the duct structures 1510-*a* and 1510-*b* may be oriented at an angular offset to surface normal of the intersection between the planar regions 1530-*a* and 1530-*b* and the one or more surfaces 1540-*b*. Thus, an input aperture may be formed within the first light coupling device 1500. Based at least in part on the intersecting substrate portions of the duct structures 1510-*a* and 1510-*b*, a corner of first light coupling device 1500 (i.e., a corner of one or more of the respective duct structures 1510-*a* and 1510-*b*) may form an planar region of the input aperture. Prism plinth 1505 may have an equal thickness at least one of the duct structures 1510-*a* and 1510-*b*. Alternatively, prism plinth 1505 may exhibit a thickness distinct from each of the duct structures 1510-*a* and 1510-*b*.

In some cases, at least a portion of the substrates contained within first light coupling device 1500 may be polished or coated, either individually or as a group. For example, each of planar regions 1530-*a* and 1530-*b* may include a fully reflective coating element as a means to sustain light reflectivity and thus sustain parallelism between an incident input pupil and the emitted output pupil. Surface 1540-*a* of the prism plinth 1505 and one or more surface 1540-*b* of the one or more duct structures 1510-*a* and 1510-*b*, may include a partially reflective coating element. The partially reflective coating elements may be uniform or may vary. In some cases, the partially reflective coating elements may be used to provide uniform output intensity at the output pupil of first light coupling device 1500 (e.g., constant pupil brightness throughout the reflected light comprising the output pupil) according to uniform or varying incidence angles, wavelengths, polarizations, and the like. Additionally, each of the one or more ends of the duct structures 1510-*a* and 1510-*b* may include an absorptive coating element as a means to at least inhibit stray light within the duct structures 1510-*a* and 1510-*b* of first light coupling device 1500. That is, one or more light beams (e.g., modes) within at least one of duct structures 1510-*a* and 1510-*b* that are not incident to a reflective coating element of the planar regions 1530 and/or surfaces 1540-*a* and 1540-*b*, may be obstructed by the absorptive coating elements disposed within duct structures 1510-*a* and 1510-*b*, as a means to reduce unnecessary light emission at the output pupil emitted by first light coupling device 1500.

Figure 16:
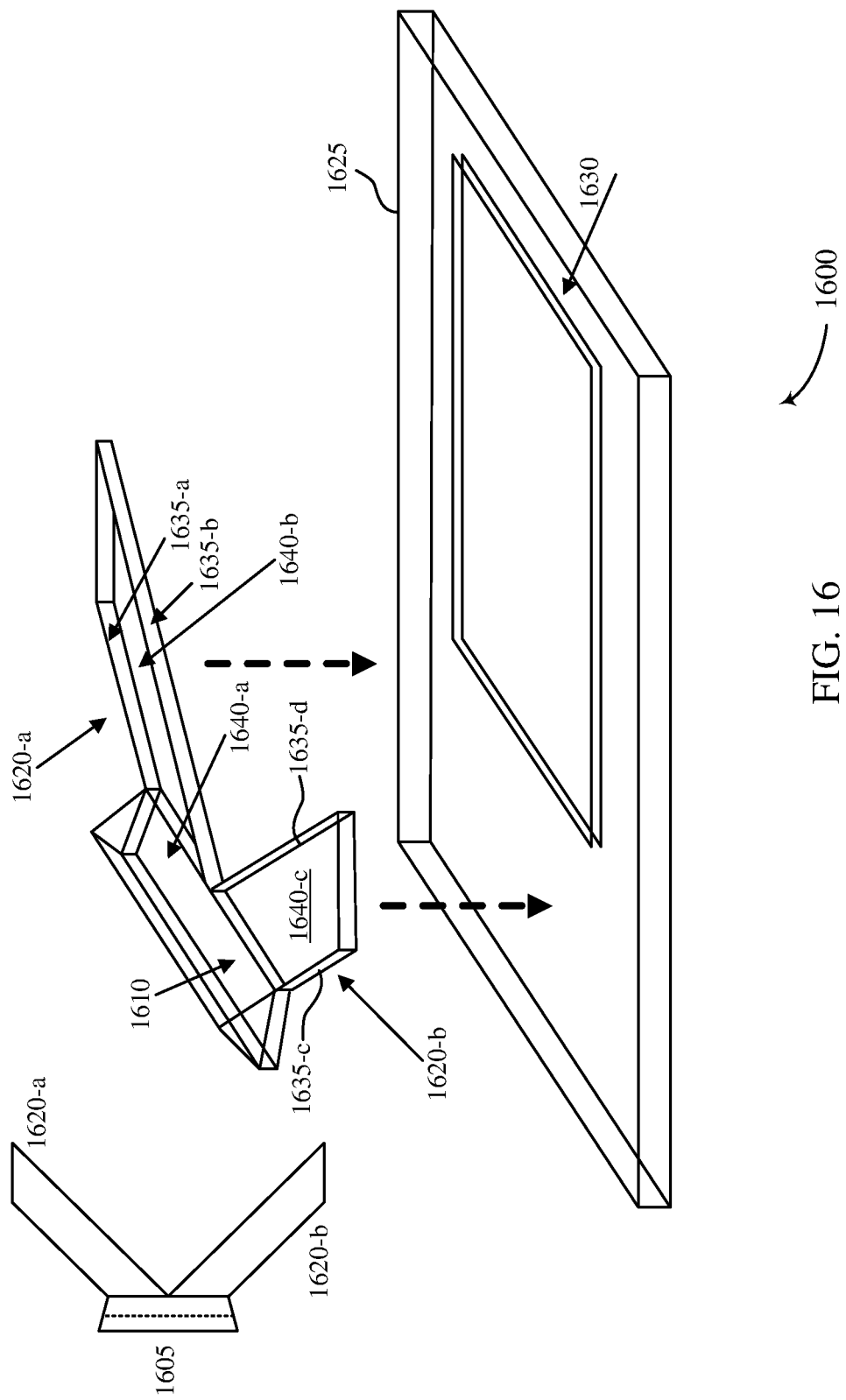
FIG. 16 illustrates an example of an assembly of an optical system that supports duct pupil expansion in accordance with various aspects of the present disclosure.

FIG. 16 illustrates an example of an assembly of an optical system 1600 that supports duct pupil expansion in accordance with various aspects of the present disclosure. Optical system 1600 includes a fabricated first light coupling device intercoupled with a waveguide 1625. Waveguide 1625 may include a second light coupling device 1630. Optical system 1600 may represent an embodied implementation of first light coupling device 1500 as described with reference to FIG. 15.

Duct structures 1620-*a* and 1620-*b* may be arranged and disposed at relative angles (e.g., orthogonal) to form a first light coupling device (i.e., a chevron cross coupler). The first light coupling device may be classified as a waveguide structure. Duct structures 1620-*a* and 1620-*b* may be uniform or vary in size and dimension, and may be oriented such that the output pupil emitted by the first light coupling device is laterally homogeneous. At duct structure 1620-*a*, each of planar regions 1635-*a* and 1635-*b* may support parallelism as a means to preserve image resolution. Similarly, at duct structure 1620-*b*, each of planar regions 1635-*c* and 1635-*d* may support parallelism. A light input section 1605 may be abutted to at least one of duct structures 1620-*a* and 1620-*b* via at least the included prism plinth 1610 and an adjoining prism. In some cases, light input section 1605 may be positioned at an planar region of the first light coupling device. Each of planar regions 1635-*a*, 1635-*b*, 1635-*c*, and 1635-*d*, of duct structures 1620-*a* and 1620-*b*, may include a fully reflective coating element as a means to sustain light reflectivity of one or more incident nodes comprising an input pupil of the first light coupling device. Surface 1640-*a* of prism plinth 1610, as well as surfaces 1640-*b* and 1640-*c* of duct structures 1620-*a* and 1620-*b*, may include a partially reflective coating element. The partially reflective coating elements may be uniform or may vary.

In some cases, the partially reflective coating elements may be spatially and/or angularly selective as a means to increase transmission efficiency within the first light coupling device. For example, due to large mode angles (e.g., large offset with regard to surface normal) reflecting off of surfaces 1640-*a*, 1640-*b*, and 1640-*c* less frequently than small mode angles, the one or more disposed partially reflective coating elements may include greater transmissivity at the distal planar regions of surface 1640-*a* corresponding to prism plinth 1610 and distal planar regions of surfaces 1640-*a* and 1640-*b*. Thus, light directed through prism plinth 1610 and remaining in duct structures 1620-*a* and 1620-*b* may be equalized. As a result, the output intensity of reflected light corresponding to large mode angles may be substantially equivalent to reflected light at small mode angles. In addition, the partially reflective coating elements disposed at surfaces 1640-*a*, 1640-*b*, and 1640-*c* may include characteristic embodiments for constant mode transmission, particularly at a low FOV orientation design of the first light coupling element. A low FOV orientation may limit one or more variance factors of the transmission. Additionally or alternatively, a metallic or dielectric coating elements may be disposed at surface 1640-*a* of prism plinth 1610 or surfaces 1640-*a* and 1640-*c* of duct structures 1620-*a* and 1620-*b*. The metallic or dielectric coating elements may exhibit angle and/or wavelength dependence within the respective portions of the first light coupling device. In other cases, the coating elements may be spatially varying and/or exhibit azimuthal selectivity.

The first light coupling device, including light input section 1605 and duct structures 1620-*a* and 1620-*b*, may be coupled to waveguide 1625. Surfaces 1640-*a*, 1640-*b*, and 1640-*c* of the first light coupling device may be surface adhered or otherwise in contact with waveguide 1625 (e.g., surface chevron assembly). An optical adhesive may be employed in performing the surface adhesion, and the adhesive may index-match the glass surfaces of the first light coupling device and/or waveguide 1625. In some cases, surfaces 1640-*a*, 1640-*b*, and 1640-*c* of the first light coupling device may sustain parallelism to the surface of waveguide 1625 (e.g., via a ZeroWave). In other cases, surfaces 1640-*a*, 1640-*b*, and 1640-*c* of the first light coupling device and/or the surface of waveguide 1625 may not be substantially level (i.e., flat). As a result, a non-uniform adhesive may be disposed within the intercoupling to allow conformity of the one or more substrates comprising surfaces 1640-*a*, 1640-*b*, and 1640-*c* to the surface of waveguide 1625.

Waveguide 1625 may include a second light coupling device 1630. In some cases, second light coupling device 1630 may be a volume holographic light coupling element and may employ one or more skew mirror type components or devices. Utilizing skew mirror technology in second light coupling device 1630 may improve viewing capability and optical clarity of the optical system 1600. Second light coupling device 1630 may also exhibit achromatic characteristics and provide a more expansive FOV while obviating impedances to optical clarity. In some cases, second light coupling device 1630 may be Bragg-mismatched to one reflection of TIR mode light emitted from the intercoupled duct structures 1620-*a* and 1620-*b*. Based at least in part on the implemented skew mirror type components or devices, second light coupling device 1630 may further achieve an external FOV subject to a higher proportionality of the TIR angle range at light modes directed to second light coupling device 1630 (i.e., employ pupil expansion techniques). For example, at a bulk index of refraction of 1.5, an external FOV of second light coupling device 1630 may be approximately 1.5 times the TIR angle range of the one or more light modes of the output pupil emitted by duct structures 1620-*a* and 1620-*b* and coupled at second light coupling device 1630.

Figure 17A:
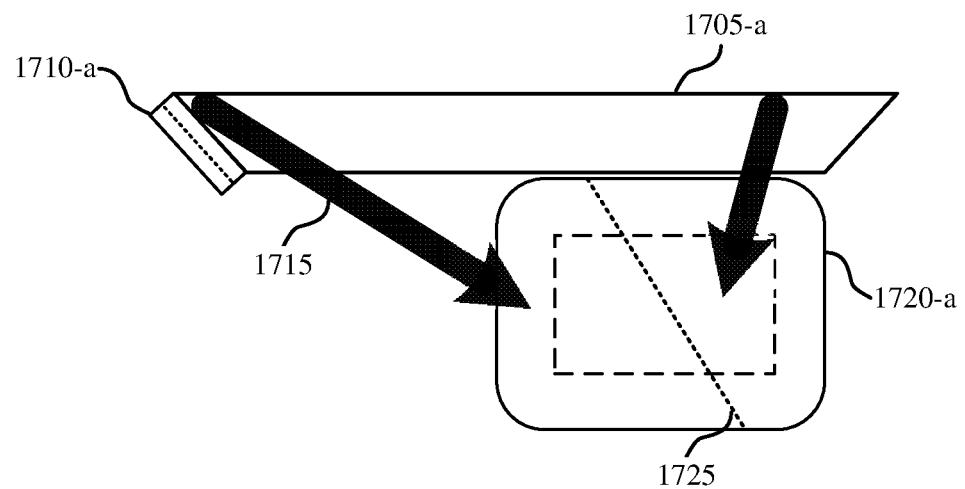
FIG. 17A illustrates an example of an optical lens that supports duct pupil expansion in accordance with various aspects of the present disclosure.

FIG. 17A illustrates an example of an optical lens 1700-*a* that supports duct pupil expansion in accordance with various aspects of the present disclosure. In some configurations, optical lens 1700-*a* may be implemented by HMD device 100 with reference to FIG. 1. In some configurations, optical lens 1700-*a* may be implemented in conjunction with waveguides 365 and 370 with reference to FIG. 3. Additionally or alternatively, in some configurations, optical lens 1700-*a* may be an example of, or implemented in conjunction with, aspects of optical system 1200 with respect to FIG. 12 and/or optical system 1300 with respect to FIG. 13.

Duct structure 1705-*a*, whether surface coupled or planar region coupled to a heterogeneous waveguide, may be implemented within optical lens 1700-*a* in a non-chevron configuration. Duct structure 1705-*a* may promote a more compact coupler design within optical lens 1700-*a*. The configuration of duct structure 1705-*a* may provide aspects for implementing light propagation and pupil replication at second light coupling devices 1720-*a*. In some cases, additional duct pupil expanders may be oriented at varying or consistent angles of orientation relative to the duct structure 1705-*a*.

As illustrated in FIG. 17A, duct structure 1705-*a* may be oriented such that an planar region of duct structure 1705-*a* is substantially parallel to a lateral planar region of second light coupling device 1720-*a*. A light input section 1710-*a* may be abutted to an end of duct structure 1705-*a* and may include one or more of a prism, a prism plinth, beveled planar region, a diffractive element, or the like. One or more incident light beams (e.g., modes 1715) of an input pupil may be directed through duct structure 1705-*a* via an aperture positioned with light input section 1710-*a*. Modes 1715 may be directed, via reflective coating elements of duct structure 1705-*a*, to second light coupling device 1720-*a*. In some cases, second light coupling device 1720-*a* may be a volume holographic light coupling element and may include one or more skew mirror type components or devices. The one or more components of second light coupling device 1720-*a* may exhibit a reflective axis offset (e.g., 30 degrees) from surface normal of second light coupling device 1720-*a*, as represented by the planar projection 1725. Based at least in part on the reflective axis, second light coupling device 1720-*a* may direct the in-coupled light reflected by and propagated via duct structure 1705-*a* to an eye box for image projection.

Figure 17B:
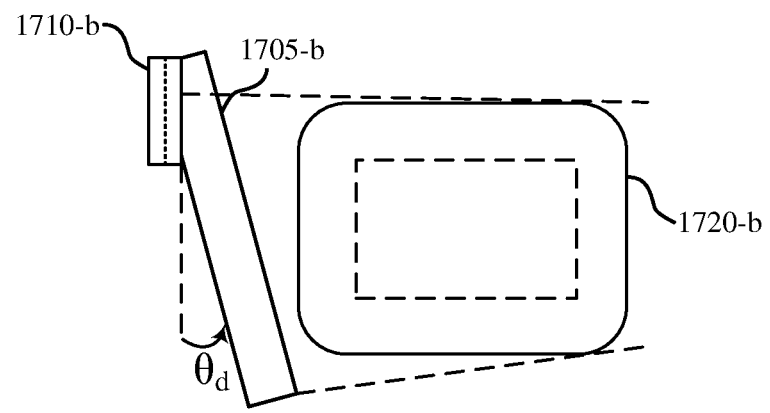
FIG. 17B illustrates an example of an optical lens that supports duct pupil expansion in accordance with various aspects of the present disclosure.

FIG. 17B illustrates an example of an optical lens 1700-*b* that supports duct pupil expansion in accordance with various aspects of the present disclosure. In some configurations, optical lens 1700-*b* may be implemented by HMD device 100 with reference to FIG. 1. In some configurations, optical lens 1700-*a* may be implemented in conjunction with waveguides 365 and 370 with reference to FIG. 3. Additionally or alternatively, in some configurations, optical lens 1700-*b* may be an example of, or implemented in conjunction with, aspects of optical system 1200 with respect to FIG. 12 and/or optical system 1300 with respect to FIG. 13.

Duct structure 1705-*b*, whether surface coupled or planar region coupled to a heterogeneous waveguide, may be implemented within optical lens 1700-*b* in a non-chevron configuration. Duct structure 1705-*b* may promote a more compact coupler design within optical lens 1700-*b*. The configuration of duct structure 1705-*b* may provide aspects for implementing light propagation and pupil replication at second light coupling devices 1720-*b*. In some cases, additional duct pupil expanders may be oriented at varying or consistent angles of orientation relative to the duct structure 1705-*b*.

As illustrated in FIG. 17B, a light input section 1710-*b* may be abutted to duct structure 1705-*b* via a non-adjacent orientation. Duct structure 1705-*b* may be aligned with light input section 1710-*b* by an angle offset $\theta_d$ (e.g., $\theta_d=12$). The angular offset may promote guided light emission from duct structure 1705-*b* to second light coupling device 1720-*b*. In some cases, second light coupling device 1720-*b* may be a volume holographic light coupling element and may include one or more skew mirror type components or devices. Second light coupling device 1720-*b* may direct the in-coupled light reflected by and propagated via duct structure 1705-*b* to an eye box for image projection.

Figure 18:
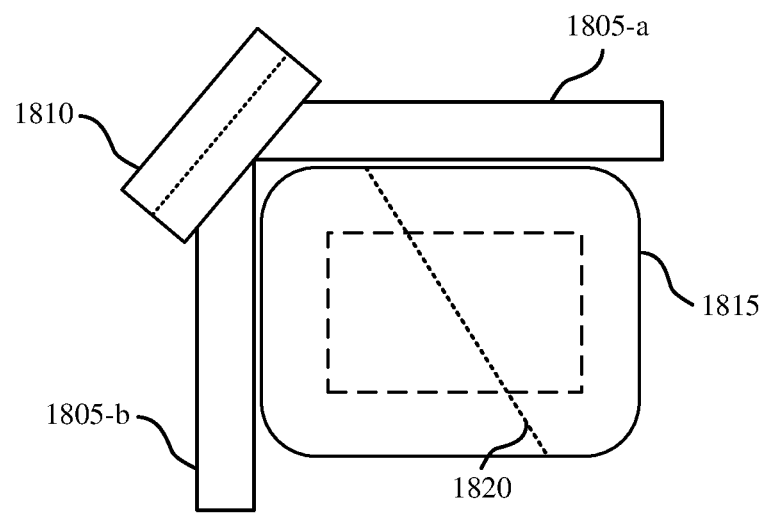
FIG. 18 illustrates an example of an optical lens that supports duct pupil expansion in accordance with various aspects of the present disclosure.

FIG. 18 illustrates an example of an optical lens 1800 that supports duct pupil expansion in accordance with various aspects of the present disclosure. In some configurations, optical lens 1800 may be implemented by HMD device 100 with reference to FIG. 1. In some configurations, optical lens 1800 may be implemented in conjunction with waveguides 365 and 370 with reference to FIG. 3. Additionally or alternatively, in some configurations, optical lens may be an example of, or implemented in conjunction with, aspects of optical system 1200 with respect to FIG. 12 and/or optical system 1300 with respect to FIG. 13.

Duct structures 1805-*a* and 1805-*b* may be oriented as substantially horizontal and substantially vertical with reference to an orientation axis of second light coupling device 1815. Duct structures 1805-*a* and 1805-*b* may also be aligned with one or more lateral planar regions and one or more longitudinal planar regions of second light coupling device 1815. Light input section 1810 may be abutted to both duct structures 1805-*a* and 1805-*b*, and may be oriented to in-couple one or more incident light beams (e.g., modes) of an input pupil at each of the duct structures 1805-*a* and 1805-*b*. Light input section 1810 and each of duct structures 1805-*a* and 1805-*b* may include a first light coupling element. The orientation of the components (e.g., light input section 1810, duct structures 1805-a and 1805-b, etc.) may aid the first light coupling device in achieving a more compact and less visually obstructive design. For example, based at least in part on the aforementioned orientation, the first light coupling device may be masked in a glass frame or substrate element. The first light coupling device may be intercoupled with a waveguide, including second light coupling device 1815. In some cases, second light coupling device 1815 may be a volume holographic light coupling element and may include one or more skew mirror type components or devices. The one or more components of second light coupling device 1815 may exhibit a reflective axis offset (e.g., 30 degrees) from surface normal of second light coupling device 1815, as represented by the planar projection 1820. Based at least in part on the reflective axis, second light coupling device 1815 may direct the in-coupled light reflected by and propagated via the first light coupling device to an eye box for image projection.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein given the benefit of the present disclosure. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein throughout the entirety of the specification, should be understood to control over dictionary definitions, definitions in documents incorporated by reference, and/or ordinary meanings of the defined terms. The terms and phases described below are not to be accorded any special meaning by comparison with the other terms and phases described above and throughout the specification. Rather, the terms and phases described below are provided for additional clarity and as further examples of the subject technology in accordance with aspects of the present disclosure.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 221.03.

The term "approximately," refers to plus or minus 10% of the value given.

The term "about," refers to plus or minus 20% of the value given.

The term "reflective axis" refers to an axis that bisects an angle of incident light relative to its reflection. The absolute value of an angle of incidence of the incident light relative to the reflective axis is equal to the absolute value of the angle of reflection of the incident light's reflection, relative to the reflective axis. For conventional mirrors, the reflective axis is coincident with surface normal (i.e., the reflective axis is perpendicular to the mirror surface). Conversely, implementations of skew mirrors according to the present disclosure may have a reflective axis that differs from surface normal, or in some cases may have a reflective axis that is coincident with surface normal. Persons skilled in the art given the benefit of the present disclosure will recognize that a reflective axis angle can be determined by adding an angle of incidence to its respective angle of reflection, and dividing the resulting sum by two. Angles of incidence and angles of reflection can be determined empirically, with multiple measurements (generally three or more) used to generate a mean value.

The term "reflection" and similar terms are used in this disclosure in some cases where "diffraction" might ordinarily be considered an appropriate term. This use of "reflection" is consistent with mirror-like properties exhibited by skew mirrors and helps avoid potentially confusing terminology. For example, where a grating structure is said to be configured to "reflect" incident light, a conventional artisan might prefer to say the grating structure is configured to "diffract" incident light, since grating structures are generally thought to act on light by diffraction. However, such use of the term "diffract" would result in expressions such as "incident light is diffracted about substantially constant reflective axes," which could be confusing. Accordingly, where incident light is said to be "reflected" by a grating structure, persons of ordinary skill in art, given the benefit of this disclosure, will recognize that the grating structure is in fact "reflecting" the light by a diffractive mechanism. Such use of "reflect" is not without precedent in optics, as conventional mirrors are generally said to "reflect" light despite the predominant role diffraction plays in such reflection. Artisans of ordinary skill thus recognize that most "reflection" includes characteristics of diffraction, and "reflection" by a skew mirror or components thereof also includes diffraction.

The term "light" refers to electromagnetic radiation familiar to persons skilled in the art. Unless reference is made to a specific wavelength or range of wavelengths, such as "visible light", which refers to a part of the electromagnetic spectrum visible to the human eye, the electromagnetic radiation can have any wavelength.

The terms "hologram" and "holographic grating" refer to a recording of an interference pattern generated by interference between multiple intersecting light beams. In some examples, a hologram or holographic grating may be generated by interference between multiple intersecting light beams where each of the multiple intersecting light beams remains invariant for an exposure time. In other examples, a hologram or holographic grating may be generated by interference between multiple intersecting light beams where an angle of incidence of at least one of the multiple intersecting light beams upon the grating medium is varied while the hologram is being recorded, and/or where wavelengths are varied while the hologram is being recorded (e.g., a complex hologram or complex holographic grating).

The term "sinusoidal volume grating" refers to an optical component which has an optical property, such as refractive index, modulated with a substantially sinusoidal profile throughout a volumetric region. Each (simple/sinusoidal) grating corresponds to a single complementary vector pair in k-space (or a substantially point-like complementary pair distribution in k-space).

The term "entrance pupil" refers to a real or virtual aperture passing a beam of light, at its minimum size, entering into imaging optics.

The term "eye box" refers to a two-dimensional area outlining a region wherein a human pupil may be placed for viewing the full field of view at a fixed distance from a grating structure.

The term "eye relief" refers to a fixed distance between a grating structure and a corresponding eye box.

The term "exit pupil" refers to a real or virtual aperture passing a beam of light, at its minimum size, emerging from imaging optics. In use, the imaging optics system is typically configured to direct the beam of light toward image capture means. Examples of image capture means include, but are not limited to, a user's eye, a camera, or other photodetector.

The term "grating medium" refers to a physical medium that is configured with a grating structure for reflecting light. A grating medium may include multiple grating structures.

The term "grating structure" refers to one or more gratings configured to reflect light. In some examples, a grating structure may include a set of gratings that share at least one common attribute or characteristic (e.g., a same wavelength of light to which each of the set of gratings is responsive). In some implementations, a grating structure may include one or more holograms. In other implementations, a grating structure may include one or more sinusoidal volume gratings. In some examples, the grating structures may be uniform with respect to a reflective axis for each of the one or more gratings (e.g., holograms or sinusoidal gratings). Alternatively or additionally, the grating structures may be uniform with respect to a length or volume for each of the one or more gratings (e.g., holograms or sinusoidal volume gratings) within the grating medium.

The term "polarization" refers to a property applying to transverse waves that specifies the geometrical orientation of the oscillations. Light in the form of a plane wave in space may be classified as linearly polarized. Implicit in the parameterization of polarized light is the orientation of the reference coordinate frame. A common coordinate system relates to a plane of incidence of the light associated with the incoming propagation direction of the light and the vector perpendicular to the plane of interface. A 'p' polarization state may refer to linearly polarized light whose electric field is along (e.g., parallel) to the plane of incidence. A 's' polarization state may refer to linearly polarized light whose electric field is normal to the plane of incidence. 'P' polarized light may also be referred to as transverse-magnetic (TM), pi-polarized, or tangential plane polarized light. 'S' polarized light may also be referred to as transverse-electric (TE), sigma-polarized, or sagittal plane polarized light.

The term "azimuth angle" refers to an angle between a perpendicularly projected vector onto a reference plane and a reference vector of the reference plane. A reflective coating of a substrate element may exhibit azimuthal selectivity, meaning a variance in reflectivity associated with an azimuth angle of an incident light beam (e.g., mode) at the reflective coating. In some cases, all parallel modes at a reference azimuth angle desired for a light coupling device may be highly transmissive through the reflective coating. Alternatively, the more the azimuth angle of an incident mode deviates from the reference azimuth angle of the coating, the greater the reflectivity at the coating element. As a result, two modes with the same angle of incidence but differing azimuth angles with reference to the substrate may experience different levels of reflectivity. Such a property at the reflective coating elements of a light coupling device may prevent light from escaping in a suboptimal direction of the substrate.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

In the appended figures, similar components or features may have the same reference label. Further, various components of the same type may be distinguished by following the reference label by a dash and a second label that distinguishes among the similar components. If just the first reference label is used in the specification, the description may be applicable to any one of the similar components having the same first reference label irrespective of the second reference label.

What is claimed is:

1. An electronic device comprising:
   a waveguide having a first substrate, a second substrate, and a medium interposed between the first substrate and the second substrate, wherein the first substrate has a first lateral surface facing the medium and an opposing second lateral surface, the second substrate has a third lateral surface facing the medium and an opposing fourth lateral surface, and the waveguide has an edge that extends from the second lateral surface to the fourth lateral surface;
   a duct having a longitudinal axis; and
   an optical coupler configured to couple light into the duct, wherein the duct is configured to propagate the light via total internal reflection along the longitudinal axis, the duct is configured to couple the light into the waveguide through a surface of the duct and the edge of the waveguide, and the surface of the duct extends along the longitudinal axis.

2. The electronic device of claim 1, wherein the surface of the duct is attached to the edge of the waveguide.

3. The electronic device of claim 1, further comprising:
   an output coupler in the medium and configured to couple the light out of the waveguide, the output coupler comprising a plurality of volume holograms.

4. The electronic device of claim 1, further comprising:
   an output coupler in the medium and configured to couple the light out of the waveguide, the output coupler comprising a louvered mirror.

5. The electronic device of claim 1, wherein the duct has a first additional surface and a second additional surface parallel to the first additional surface, the first additional surface and the second additional surface extend along the longitudinal axis, and the surface of the duct extends from the first additional surface to the second additional surface.

6. The electronic device of claim 5, wherein the first additional surface of the duct is coplanar with the second lateral surface of the waveguide and wherein the second additional surface of the duct is coplanar with the fourth lateral surface of the waveguide.

7. The electronic device of claim 6, wherein the duct has a third additional surface parallel to the surface of the duct, the third additional surface extends along the longitudinal axis, and the duct has a fourth additional surface that extends from the surface of the duct to the third additional surface at a first non-perpendicular angle with respect to the surface of the duct and at a second non-perpendicular angle with respect to the third additional surface of the duct.

8. The electronic device of claim 1, further comprising:
   an additional duct having an additional longitudinal axis oriented at a non-parallel angle with respect to the longitudinal axis of the duct structure, wherein the optical coupler is configured to couple additional light into the additional duct, the additional duct is configured to propagate the additional light via total internal reflection along the additional longitudinal axis, the additional duct is configured to couple the additional light into the waveguide through a surface of the additional duct, and the surface of the additional duct extends along the additional longitudinal axis.

9. The electronic device of claim 8, further comprising a chevron fill that couples the surface of the duct and the surface of the additional duct to the edge of the waveguide.

10. The electronic device of claim 8, wherein the waveguide has an additional edge that extends from the second lateral surface to the fourth lateral surface, the additional edge is non-parallel with respect to the edge, and the additional duct is configured to couple the additional light into the waveguide through the additional edge of the waveguide.

11. The electronic device of claim 10, wherein the additional longitudinal axis is perpendicular to the longitudinal axis.

12. An electronic device comprising:
    a waveguide having a first layer, a second layer, and a third layer interposed between the first and second layers, wherein the first layer has a first lateral surface facing the third layer and an opposing second lateral surface, the second layer has a third lateral surface facing the third layer and an opposing fourth lateral surface, and the waveguide has an edge that extends from the second lateral surface to the fourth lateral surface;
    a duct having a first surface, a second surface parallel to the first surface, and a third surface that extends from the first surface to the second surface, the first surface being coplanar with the second lateral surface, and the second surface being coplanar with the fourth lateral surface; and
    an optical coupler configured to couple light into the duct, wherein the duct is configured to propagate the light via total internal reflection, the duct being configured to couple the light into the waveguide through the third surface and the edge of the waveguide.

13. The electronic device of claim 12, further comprising an output coupler in the third layer and configured to couple the light out of the waveguide.

14. The electronic device of claim 13, wherein the output coupler comprises a louvered mirror or volume holograms.

15. The electronic device system of claim 12, further comprising:
an additional duct having a fourth surface, a fifth surface parallel to the fourth surface, and a sixth surface that extends from the fourth surface to the fifth surface, wherein the fourth surface is coplanar with the second lateral surface and the first surface, the fifth surface is coplanar with the fourth lateral surface and the second surface, the optical coupler is configured to couple additional light into the additional duct, the additional duct is configured to propagate the additional light via total internal reflection, and the additional duct is configured to couple the additional light into the waveguide through the sixth surface.

16. The electronic device of claim 15, wherein the third surface extends at a non-parallel angle with respect to the sixth surface.

17. The electronic device of claim 12, wherein the optical coupler comprises an input coupling prism mounted to the duct.

18. An electronic device comprising:
a waveguide having a first substrate, a second substrate, and a medium interposed between the first substrate and the second substrate, wherein the first substrate has a first lateral surface facing the medium and an opposing second lateral surface, the second substrate has a third lateral surface facing the medium and an opposing fourth lateral surface, and the waveguide has an edge that extends from the second lateral surface to the fourth lateral surface;
a chevron-shaped optical coupler mounted to the waveguide; and
an input coupler configured to couple light into the chevron-shaped optical coupler, wherein the chevron-shaped optical coupler is configured to couple the light into the waveguide.

19. The electronic device of claim 18, wherein the chevron-shaped optical coupler comprises a first duct extending in a first direction and a second duct extending in a second direction that is non-parallel with respect to the first direction, the first duct being configured to couple a portion of the light into the waveguide through the edge of the waveguide.

20. The electronic device of claim 19, wherein the waveguide has an additional edge that extends from the second lateral surface to the fourth lateral surface and that is non-parallel with respect to the edge, the second duct being configured to couple an additional portion of the light into the waveguide through the additional edge of the waveguide.

* * * * *